(12) United States Patent
Choudhury et al.

(10) Patent No.: US 12,488,253 B2
(45) Date of Patent: *Dec. 2, 2025

(54) NEURAL NETWORK COMPRISING MATRIX MULTIPLICATION

(71) Applicant: Imagination Technologies Limited, Kings Langley (GB)

(72) Inventors: Biswarup Choudhury, Hertfordshire (GB); Aria Ahmadi, Hertfordshire (GB); James Imber, Hertfordshire (GB); Cagatay Dikici, Hertfordshire (GB); Timothy Atherton, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 985 days.

This patent is subject to a terminal disclaimer.

(21) Appl. No.: 17/568,325

(22) Filed: Jan. 4, 2022

(65) Prior Publication Data
US 2022/0253716 A1 Aug. 11, 2022

(30) Foreign Application Priority Data

Jan. 4, 2021 (GB) .................... 2100044
Jan. 4, 2021 (GB) .................... 2100046
Jun. 29, 2021 (GB) .................... 2109340

(51) Int. Cl.
*G06N 3/10* (2006.01)
*G06F 17/16* (2006.01)
(Continued)

(52) U.S. Cl.
CPC ............... *G06N 3/10* (2013.01); *G06F 17/16* (2013.01); *G06N 3/04* (2013.01); *G06N 3/063* (2013.01);
(Continued)

(58) Field of Classification Search
CPC ............ G06N 3/10; G06N 3/04; G06N 3/063; G06N 3/045; G06N 3/044; G06F 17/16; G06V 10/82
See application file for complete search history.

(56) References Cited

U.S. PATENT DOCUMENTS

2018/0121796 A1   5/2018   Deisher et al.
2018/0173676 A1   6/2018   Tsai et al.
(Continued)

FOREIGN PATENT DOCUMENTS

CN         110580324 A    12/2019
EP           3153996 A2    4/2017
(Continued)

OTHER PUBLICATIONS

Zhang et al; "Caffeine: Toward Uniformed Representation and Acceleration for Deep Convolutional Neural Networks"; IEEE Transactions on Computer Aided Design of Integrated Circuits and Systems; vol. 38; 2019; pp. 1-14.
(Continued)

*Primary Examiner* — Quoc A Tran
(74) *Attorney, Agent, or Firm* — Potomac Law Group, PLLC; Vincent M DeLuca

(57) ABSTRACT

A method and data processing system implement a neural network containing at least one matrix multiplication operation. The matrix multiplication operation is mapped to a graph of neural network operations including at least one transformation and at least one convolution. The at least one convolution is implemented in fixed-function hardware of a neural network accelerator.

20 Claims, 13 Drawing Sheets

(51) Int. Cl.
  *G06N 3/04* (2023.01)
  *G06N 3/044* (2023.01)
  *G06N 3/045* (2023.01)
  *G06N 3/063* (2023.01)
  *G06V 10/82* (2022.01)

(52) U.S. Cl.
  CPC ............. *G06V 10/82* (2022.01); *G06N 3/044* (2023.01); *G06N 3/045* (2023.01)

(56) References Cited

U.S. PATENT DOCUMENTS

| | | |
|---|---|---|
| 2020/0073911 A1 | 3/2020 | Whatmough et al. |
| 2020/0356836 A1 | 11/2020 | Hargil et al. |
| 2020/0356837 A1 | 11/2020 | Hargil et al. |
| 2021/0081804 A1* | 3/2021 | Stojevic .................. G06N 3/088 |
| 2021/0097375 A1 | 4/2021 | Huynh et al. |
| 2022/0383992 A1* | 12/2022 | Triendl .................. G06N 3/045 |

FOREIGN PATENT DOCUMENTS

| | | |
|---|---|---|
| EP | 3153996 A3 | 8/2017 |
| EP | 3330898 A1 | 6/2018 |
| GB | 2582868 A | 10/2020 |
| WO | 9203795 A1 | 3/1992 |

OTHER PUBLICATIONS

Gibson et al; "Optimizing Grouped Convolutions on Edge Devices"; https://www.researchgate.net/figure/Standard-vs-grouped-convolutions-a-In-a-standard-convolution-S-each-filter-is_fig1_342242494; 14 pages.
Saha; "A Comprehensive Guide to Convolutional Neural Networks—the EL15 way"; https://towardsdatascience.com/a-comprehensive-guide-to-convolutional-neural-networks-the-eli5-way-3bd2b1164a53; 17 pages.
Wikipedia the Free Encyclopedia; "Matrix Multiplication" 14 pages.

* cited by examiner

NEURAL NETWORK COMPRISING MATRIX MULTIPLICATION

BACKGROUND

Matrix multiplications arise in a number of contexts in neural networks. A single matrix multiplication has the form $$Z=XY$$

In this equation, X is a matrix having dimensions [P, Q] and Y is a matrix having dimensions [Q, R]. The output Z is a matrix having dimensions [P, R]. Treating the matrices as 4-D tensors, X has dimensions [1, 1, P, Q], Y has dimensions [1, 1, Q, R], and Z has dimensions [1, 1, P, R].

Throughout this document, "NCHW" notation is adopted for a data tensor, where N is the number of batches, C is the number of channels, H is the height, and W is the width. Likewise, "OIHW" notation is adopted for weights/coefficients, where O is the number of output channels, I is the number of input channels, H is the kernel height and W is the kernel width.

The task of matrix multiplication can be generalised to batch matrix multiplication, which involves performing multiple matrix multiplications in the same operation. For batch matrix multiplication, the two leading dimensions of the 4-D tensors defined above are allowed to have sizes greater than one. Thus, the more general form is a tensor X with dimensions [M, N, P, Q], and a tensor Y with dimensions [M', N', Q, R]. This represents (max(M, M') max(N, N')) respective multiplications, between matrices of size [P, Q] and [Q, R], performed in the same operation.

If M and M' are both greater than 1, then they are equal to one another. Alternatively one or both of M and M' may be equal to 1. Likewise, if N and N' are both greater than 1, then they are equal to one another. Alternatively, one or both of N and N' may be equal to 1. When M=M' and N=N', the matrices being multiplied are all different. When any one (or two or three) of M, N, M' and N' is equal (or are equal) to 1, broadcasting is performed over the relevant dimension (or dimensions)—that is, the relevant operand is reused over the broadcast dimension, to make up the required (max(M, M') max(N, N')) matrix multiplications.

It should be understood that the definition of batch matrix multiplication above applies to any number of dimensions greater than two. In other words, the selection of 4-D tensors is not special or important—it is just convenient for the purposes of explanation. In general, there may be any number of dimensions. The matrix multiplication is performed on two of the dimensions, and the remaining dimensions (which are referred to generically as the "batch" dimensions) all have matching sizes (or have sizes that are equal to 1, in which case broadcasting is implied). The notation [ . . . , Q, . . . ] and [ . . . , R, . . . ] will be adopted to indicate any number of additional dimensions that match in the manner described above for M, N, M', and N', with two dimensions that are subject to matrix multiplication. In this notation, the additional dimensions may be positioned in one or more of before, between and after the two dimensions that are subject to matrix multiplication. The dimension of size Q in the two input tensors may be referred to as the "inner" dimension. Here, for the sake of simplicity in the examples and without loss of generality, it will be assumed that the matrix multiplication is performed on the final two dimensions. Thus, the tensors in the examples will have dimensions [ . . . , P, Q] and [ . . . , Q, R]. However, it should be understood that this is not intended to be limiting.

Batch matrix multiplication is useful in various cases. It arises in the backward pass for certain layers, during the training phase of a neural network. This is true of fully connected layers, for example. Fully connected layers are widely used, for example to generate classification outputs, in many kinds of neural network—including but not limited to neural networks used for computer vision tasks and for natural language processing (NLP). It should be understood that fully connected layers also have many other uses, including but not limited to use in multilayer perceptrons (MLPs) and for gating functions in long short-term memory (LSTM) networks. Batch matrix multiplication also arises in the forward pass for some layers, during the training and inference phases. This is true of attention based neural networks, such as transformer networks, for example. Attention based neural networks have traditionally been used primarily for NLP; however, more recently, they have also been used to advantage in computer vision tasks.

An outer product of two vectors can be seen as a special case of matrix multiplication, in which Q=1. This can be generalised to a batch outer product by analogy to batch matrix multiplication, in which tensors X of shape [M, N, P, 1] and Y of shape [M', N', 1, R] are multiplied, and the terms M, N, M' and N' are as defined above in the case of batch matrix multiplication. Here, both a "single" outer product and a batch outer product will be referred to generically as outer products. To implement an outer product by means of matrix multiplication, the first input (X) should be a column vector or tensor with width 1. The second input (Y) should be a row vector or tensor with height 1. If the input vectors for the outer product operation are not provided in these forms, then a transpose or permute operation can be applied to one or both of them, as needed, to arrange them in the desired form. (As used herein, the term permute should be understood as equivalent to the common use of the term "transpose" in the field of neural networks—meaning a reordering of the dimensions of a tensor.)

Existing neural network accelerator (NNA) hardware is generally specialised in evaluating convolutional layers, and might not natively support matrix multiplication. In particular, an exemplary NNA may be adapted to multiply the same set of weights simultaneously by multiple sets of input data elements, in parallel, at multiple processing elements. The majority of computation in convolutional neural networks (CNNs) is for operations such as convolution, which require the same coefficients (weights) to be applied across multiple sets of input data. For this reason, some neural network accelerators are specialised towards this kind of operation. In some cases, matrix multiplication might not be natively supported by such NNAs; in other cases, it may be supported but relatively inefficient because of the way the hardware is designed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

It would be desirable to implement outer products, matrix multiplications, and batch matrix multiplications efficiently on existing neural network hardware. It would be desirable to do this in a way that exploits the existing specially optimised hardware, where possible. This may avoid the need to design additional specially optimised hardware, to be added to the NNA to support matrix multiplications. It may also avoid the need to perform matrix multiplications using a separate general purpose processor. The transfer of data to and from such an external general purpose processor, during the evaluation of a neural network by an NNA, may cause a significant overhead in terms of memory-access bandwidth; therefore, it would be desirable to avoid the need for such transfers, if possible.

The invention is defined by the claims.

A method and data processing system are disclosed for implementing a neural network containing at least one matrix multiplication operation. The matrix multiplication operation is mapped to a graph of neural network operations including at least one transformation and at least one convolution. The at least one convolution is implemented in fixed-function hardware of a neural network accelerator.

In this context, "fixed-function" is in contrast with general purpose processor hardware, which is fully programmable to implement any (arbitrary) function or algorithm. The behaviour of the fixed-function circuitry may be configurable to a limited extent. A module of fixed-function circuitry may for example be configured to apply different operations or handle different tensor sizes, or provide a limited set of parameters that can be used to control the behaviour of a function that it implements. However, it is not fully programmable in the sense that it could execute an arbitrary algorithm.

According to one aspect, there is provided a method of implementing, using a neural network accelerator comprising fixed-function hardware, a neural network comprising a plurality of layers, wherein at least one of the layers comprises a matrix multiplication operation defined in two or more dimensions between a first tensor X having dimensions [ . . . , P, . . . , Q, . . . ] and a second tensor Y having dimensions [ . . . , Q, . . . , R, . . . ], the method comprising: mapping the matrix multiplication operation to a graph of neural network operations including at least one transformation and at least one convolution operation; and evaluating the graph of neural network operations to thereby evaluate the matrix multiplication operation, wherein the at least one convolution operation is evaluated in the fixed-function hardware.

The first tensor X (or a tensor derived from it) may be treated as input data for the at least one convolution operation, and the second tensor Y (or a tensor derived from it) may be treated as coefficient data for the at least one convolution operation. Tensors may be derived from the first tensor X and/or second tensor Y by means of the at least one transformation.

The at least one transformation may reconfigure the second tensor Y to arrange the dimension with size R in the output channel dimension before the at least one convolution operation is evaluated.

The at least one transformation may reconfigure both tensors to arrange the dimension with size Q in the input channel dimension before the at least one convolution operation is evaluated.

The at least one transformation may reconfigure the first tensor X to arrange the dimension with size P in a dimension that is traversed by the at least one convolution operation. The traversed dimensions are commonly the height H and width W dimensions. Hence, they may also be referred to in some cases as the "spatial" dimensions.

The fixed-function hardware optionally comprises: an input buffer, configured to temporarily store input data elements; a coefficient buffer, configured to temporarily store weights; and a plurality of processing elements, each of which is configured to multiply one or more input data elements by one or more respective weights, wherein, in each of a plurality of hardware cycles: the coefficient buffer is configured to supply one set of one or more weights concurrently to all of the processing elements, and the input buffer is configured to supply each of the processing elements with respective different sets of one or more input data elements.

The hardware may be configured to evaluate the at least one convolution operation by processing in parallel several sets of one or more input data elements selected along a first dimension traversed by the convolution operation, and wherein the at least one transformation optionally reconfigures the first tensor X to arrange the dimension with size P in the first dimension.

In some examples: the first tensor X has dimensions [1, 1, P, Q] and the second tensor Y has dimensions [1, 1, Q, R]; the at least one transformation reconfigures the first tensor X to form a reconfigured first tensor having dimensions [1, Q, 1, P]; the at least one transformation reconfigures the second tensor Y to form a reconfigured second tensor having dimensions [R, Q, 1, 1]; and the reconfigured first tensor and reconfigured second tensor are input to the at least one convolution. This implements a single matrix multiplication.

In some examples: the first tensor X has dimensions [M, N, P, Q] and the second tensor Y has dimensions [M', N', Q, R], where $B=(\max(M, M') \max(N, N'))>1$; the at least one transformation splits and/or replicates, and reconfigures, the first tensor X to form B reconfigured first tensors each having dimensions [1, Q, 1, P], wherein if M'>M=1 or N'>N=1 the at least one transformation comprises replicating the first tensor in the respective dimension, and if M'=M>1 or N'=N>1 the at least one transformation comprises splitting the first tensor in the respective dimension; the at least one transformation splits and/or replicates, and reconfigures, the second tensor Y to form B reconfigured second tensors having dimensions [R, Q, 1, 1], wherein if M>M'=1 or N>N'=1 the at least one transformation comprises replicating the second tensor in the respective dimension, and if M'=M>1 or N'=N>1 the at least one transformation comprises splitting the second tensor in the respective dimension; and the at least one convolution comprises B convolutions applied to respective pairs of the first reconfigured tensors and second reconfigured tensors. In this way, a batch matrix multiplication can be implemented in a similar way to a plurality of single matrix multiplications.

If either (i) M'=1 and M>1, or (ii) N'=1 and N>1, broadcasting is performed such that the second tensor Y is reused across several convolutions. If either (i) M'=1 and M'>1, or (ii) N'=1 and N'>1, broadcasting is performed such that the first tensor X is reused in several convolutions.

In some examples: the first tensor X has dimensions [M, N, P, Q] and the second tensor Y has dimensions [M', N', Q, R]; the at least one transformation reconfigures the first tensor X to form a reconfigured first tensor having dimensions [1, BQ, 1, P]; the at least one transformation reconfigures the second tensor Y to form a reconfigured second tensor having dimensions [BR, Q, 1, 1]; and the at least one convolution comprises a grouped convolution, with B groups each with Q input channels and R output channels, applied to the reconfigured first tensor and reconfigured second tensor. Here, $B=(\max(M, M') \max(N, N'))$. If broadcasting is required (that is, if M>M'=1, if M'>M'=1, if N>N'=1, or if N'>N'=1), then this can be implemented by repeating relevant dimensions appropriately in the relevant permuted and reshaped tensors. In particular, if M'>M'=1 and/or N'>N'=1, the reconfiguration of the first tensor comprises replicating the first tensor M' times and/or N' times in the respective dimensions; and if M>M'=1 and/or N>N'=1, the reconfiguration of the second tensor comprises replicating the second tensor M times and/or N times in the respective dimensions. In this way, a batch matrix multiplication can be implemented by means of a (single) grouped convolution operation. The at least one transformation may further comprise reconfiguring the result of the grouped convolution to form an output tensor having dimensions [M, N, P, R].

The first tensor X may have dimensions [M, N, P, 1] and the second tensor Y may have dimensions [M', N', 1, R]. This implements an outer product. The first tensor is a tensor having a width equal to one; the second tensor is a tensor having a height equal to one. Optionally, in some embodiments, the tensor inputs to an outer product operation may be provided as a pair of tensors with height 1 (whereby the first tensor X has dimensions [M, N, 1, P] and the second tensor Y has dimensions [M', N', 1, R]) or a pair of tensors with width 1 (whereby the first tensor X has dimensions [M, N, P, 1] and the second tensor Y has dimensions [M', N', R, 1]). In this case, the at least one transformation may comprise a permute operation performed on at least one of the tensors, so as to produce one tensor with width 1 and one tensor with height 1, which are then suitable for processing as defined above. The permute operation may be carried out separately, or in combination with any other part of the at least one transformation.

Optionally, the first tensor X has dimensions [1, 1, P, 1] and the second tensor Y has dimensions [1, 1, 1, R]. The at least one transformation may reconfigure (reshape) the first tensor X to form a reconfigured (reshaped) first tensor having dimensions [1, P, 1, 1]; and the at least one transformation may reconfigure (reshape) the second tensor Y to form a reconfigured (reshaped) second tensor having dimensions [R, 1, 1, 1]. The at least one convolution may comprise a grouped convolution, applied to the reconfigured first tensor and reconfigured second tensor, to produce an output of dimensions [1, PR, 1, 1]. The at least one transformation may reshape this output to have dimensions [1, 1, P, R].

The at least one transformation may comprise one or more first transformations to be performed on the first tensor X and/or the second tensor Y before the at least one convolution, and optionally a second transformation to be performed on the result of the at least one convolution. In particular, the second transformation may reverse the effects of the one or more first transformations. For example, this could involve permuting the dimensions of the output data to match the dimensions of the input data prior to the first transformation. Optionally, if the neural network comprises successive layers comprising matrix multiplication operations, the second transformation may be performed only after the last layer of said successive layers.

The at least one transformation may be performed at least in part using a memory manipulation module configured to manipulate data stored in a memory. The MMM may be part of the NNA—in particular, part of the fixed-function hardware of the NNA. Alternatively, the MMM may be part of a data processing system that includes the NNA.

The memory manipulation module may comprise: an internal buffer; a memory reading block, configured to read data from the memory and write the data to the internal buffer; a memory writing block, configured to read the data from the internal buffer and write the data to the memory; and a control channel between the memory reading block and the memory writing block, wherein the memory reading block and the memory writing block are configured to communicate via the control channel to maintain synchronisation between them when writing the data to the internal buffer and reading the data from the internal buffer, respectively.

The method may optionally comprise, before mapping the matrix multiplication operation to the graph of neural network operations, analysing the matrix multiplication operation, and determining, based on a result of the analysing, how to implement the matrix multiplication operation, comprising determining that the matrix multiplication operation should be implemented using the at least one transformation and the at least one convolution operation, and rejecting at least one alternative method for implementing the matrix multiplication operation. For example, the rejected alternative method may implement the matrix multiplication by a graph of neural network operations comprising one or more element-wise operations.

The step of determining how to implement the matrix multiplication operation may be based on one or more of: a size of the first tensor in one or more dimensions; a size of the second tensor in one or more dimensions; a memory-access bandwidth required to implement the matrix multiplication operation using the selected method; a memory size required to implement the matrix multiplication operation using the selected method; a number of hardware passes through the fixed-function hardware that will be required to implement the matrix multiplication operation using the selected method; an execution time on the fixed function hardware that will be required to implement the matrix multiplication operation using the selected method; a power consumption required to implement the matrix multiplication operation using the selected method; and a capability of the fixed-function hardware. The capability may comprise the ability to instantiate weights (coefficients) for a convolution operation based on variable input data. Some existing NNAs may only be able to instantiate weights based on constants, not based on variables.

Also provided is a data processing system for implementing a neural network comprising a plurality of layers, wherein at least one of the layers comprises a matrix multiplication operation defined in two or more dimensions between a first tensor X having dimensions [ . . . , P, . . . , Q, . . . ] and a second tensor Y having dimensions [ . . . , Q . . . , R, . . . ], the data processing system comprising: a mapping unit, configured to map the matrix multiplication operation to a graph of neural network operations including at least one transformation and at least one convolution operation; and a neural network accelerator comprising fixed-function hardware, wherein the neural network accelerator is configured to evaluate the graph of neural network operations to thereby evaluate the matrix multiplication operation, wherein the at least one convolution operation is evaluated in the fixed-function hardware.

The fixed-function hardware may comprise: an input buffer, configured to temporarily store input data elements; a coefficient buffer, configured to temporarily store weights; and a plurality of processing elements, each of which is configured to multiply one or more input data elements by one or more respective weights, wherein, in each of a plurality of hardware cycles: the coefficient buffer is configured to supply one set of one or more weights concurrently to all of the processing elements, and the input buffer is configured to supply each of the processing elements with respective different sets of one or more input data elements.

The data processing system may comprise a memory manipulation module, for manipulating data stored in a memory, wherein the at least one transformation is performed using the memory manipulation module.

The memory manipulation module may comprise: an internal buffer; a memory reading block, configured to read data from the memory and write the data to the internal buffer; a memory writing block, configured to read the data from the internal buffer and write the data to the memory; and a control channel between the memory reading block and the memory writing block, wherein the memory reading block and the memory writing block are configured to communicate via the control channel to maintain synchronisation between them when writing the data to the internal buffer and reading the data from the internal buffer, respectively.

In some examples, the layer of the neural network comprising the matrix multiplication operation may be a classification layer, for classifying an input to the neural network into one of a number of categories.

The neural network may be configured for use in one of: a natural language processing application; and an image processing application. NLP applications include but are not limited to speech recognition; text-to-speech; and machine translation. An input to the neural network may comprise text data, audio data, or multimodal data—for example text data and image data (such as a caption and an associated image). Image processing applications include but are not limited to: image segmentation; image classification; optical character recognition. An input to the neural network may comprise image data or video data.

The neural network may comprise an attention-based neural network.

Also provided is a data processing system configured to perform a method as summarised above. The data processing system may be embodied in hardware on an integrated circuit.

Also provided is a method of manufacturing, using an integrated circuit manufacturing system, a data processing system as summarised above.

Also provided is a method of manufacturing, using an integrated circuit manufacturing system, a data processing system as summarised above, the method comprising: processing, using a layout processing system, a computer readable description of the data processing system so as to generate a circuit layout description of an integrated circuit embodying the data processing system; and manufacturing, using an integrated circuit generation system, the data processing system according to the circuit layout description.

Also provided is computer readable code configured to cause a method as summarised above to be performed when the code is run. Also provided is a computer readable storage medium (optionally non-transitory) having encoded thereon the computer readable code.

Further provided is an integrated circuit definition dataset that, when processed in an integrated circuit manufacturing system, configures the integrated circuit manufacturing system to manufacture a data processing system as summarised above.

Also provided is a computer readable storage medium having stored thereon a computer readable description of a data processing system as summarised above that, when processed in an integrated circuit manufacturing system, causes the integrated circuit manufacturing system to manufacture an integrated circuit embodying the data processing system.

Also provided is a computer readable storage medium having stored thereon a computer readable description of a data processing system as summarised above which, when processed in an integrated circuit manufacturing system, causes the integrated circuit manufacturing system to: process, using a layout processing system, the computer readable description of the data processing system so as to generate a circuit layout description of an integrated circuit embodying the data processing system; and manufacture, using an integrated circuit generation system, the data processing system according to the circuit layout description.

Also provided is an integrated circuit manufacturing system configured to manufacture a data processing system as summarised above.

Further provided is an integrated circuit manufacturing system comprising: computer readable storage medium having stored thereon a computer readable description of a data processing system as summarised above; layout processing system configured to process the computer readable description so as to generate a circuit layout description of an integrated circuit embodying the data processing system; and an integrated circuit generation system configured to manufacture the data processing system according to the circuit layout description. The layout processing system may be configured to determine positional information for logical components of a circuit derived from the integrated circuit description so as to generate a circuit layout description of an integrated circuit embodying the data processing system.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1A:
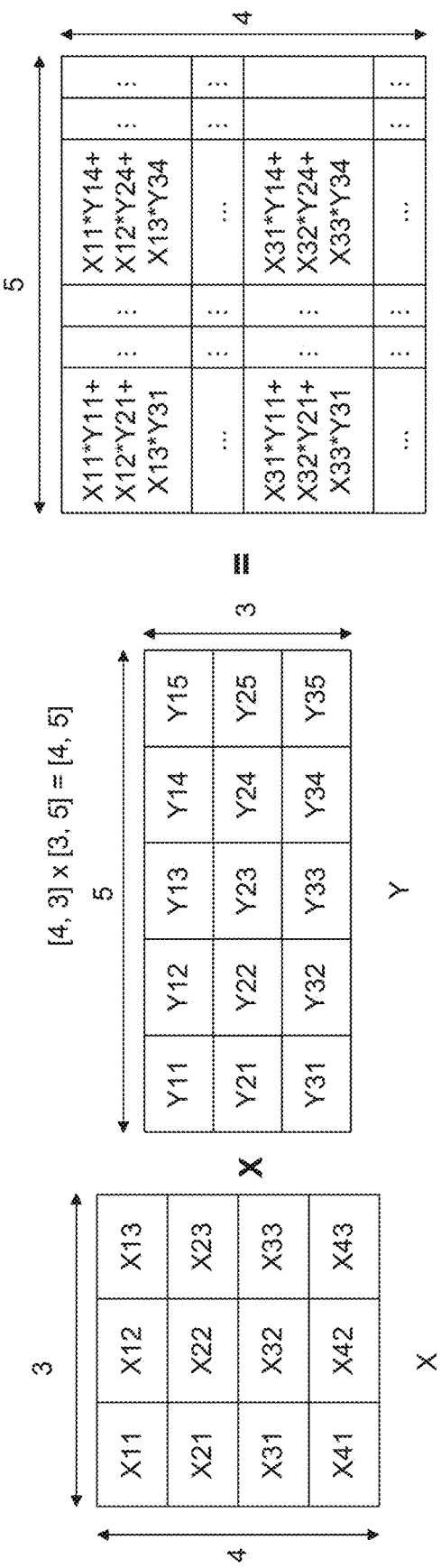
FIG. 1A illustrates a matrix multiplication operation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Faced with a desire to implement a matrix multiplication in a system using a neural network accelerator (NNA), one possibility would be to design a dedicated fixed-function hardware module that is specialised at evaluating matrix multiplication. This hardware module could then be included in the NNA, where it would take responsibility for evaluating any layers involving matrix multiplication, as needed.

Another alternative would be to evaluate the matrix multiplication in general purpose hardware outside the NNA, such as a general purpose CPU or DSP.

Providing a dedicated fixed-function hardware module in an NNA may allow for an optimised, fast evaluation. However, it has the drawback that the dedicated fixed-function hardware module occupies additional area in the integrated circuit. This area will be inactive, except when called upon to evaluate a matrix multiplication.

Meanwhile, evaluating the matrix multiplication in general purpose hardware allows for flexibility, and avoids leaving large areas of the NNA underutilised; however, it is typically less efficient, because the hardware is less specialised. The configurability of general purpose hardware incurs a cost in power and area because: (i) additional logic is required to route the data flexibly; (ii) computational elements cannot be as specialised, meaning that computational density is generally not as high as for fixed-function hardware; and (iii) it is harder to balance the bandwidth and compute requirements of the hardware. Dedicated hardware can be more efficient because it is designed such that it does not include any more functionality than is strictly necessary for the relevant task.

Additionally, when using general-purpose hardware that is external to the NNA, there is an overhead in transferring the necessary data from the NNA to the general-purpose hardware (for example, CPU). This typically involves the NNA writing the data to a memory, and the CPU reading the data from the memory, before evaluating the matrix multiplication. This is likely to slow down the evaluation of the matrix multiplication, especially if—as is often the case—the speed of memory access dominates. Furthermore, CPU time is often at a premium due to the requirements of the operating system and other processes being run. Spending CPU time evaluating matrix multiplications may cause these other processes to slow down and is an inefficient use of resources. The same is also true for GPUs and DSPs.

Examples according to the present disclosure provide ways to implement matrix multiplications (including batch matrix multiplications and outer product operations) in hardware, based on elementary neural network operations that are available on an exemplary NNA. These elementary neural network operations include element-wise operations, transformations, and convolutions.

Figure 1B:
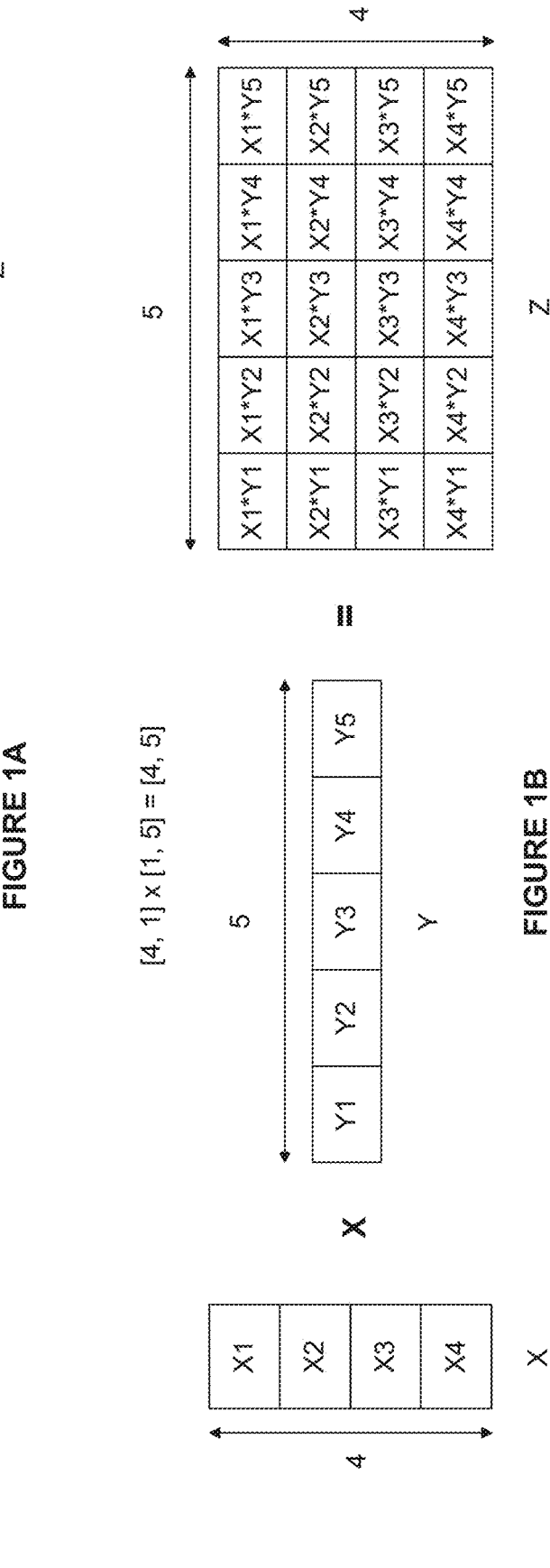
FIG. 1B illustrates an outer product, as a special case of matrix multiplication.

FIG. 1A illustrates a matrix multiplication between a 4×3 matrix X and a 3×5 matrix Y. Here, the "inner" dimension, over which summation is performed, has size Q=3. The result of the matrix multiplication is a 4×5 matrix Z. FIG. 1B illustrates an outer product operation. The outer product, between a column vector X and a row vector Y, represents a special case of matrix multiplication, in which the inner dimension is of size Q=1.

Figure 1C:
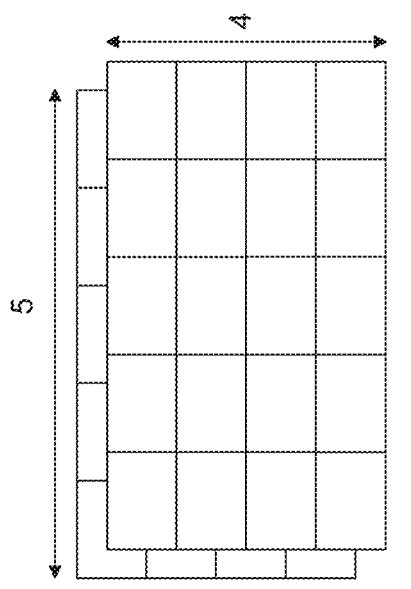
FIG. 1C illustrates a batch matrix multiplication.
Figure 1C:
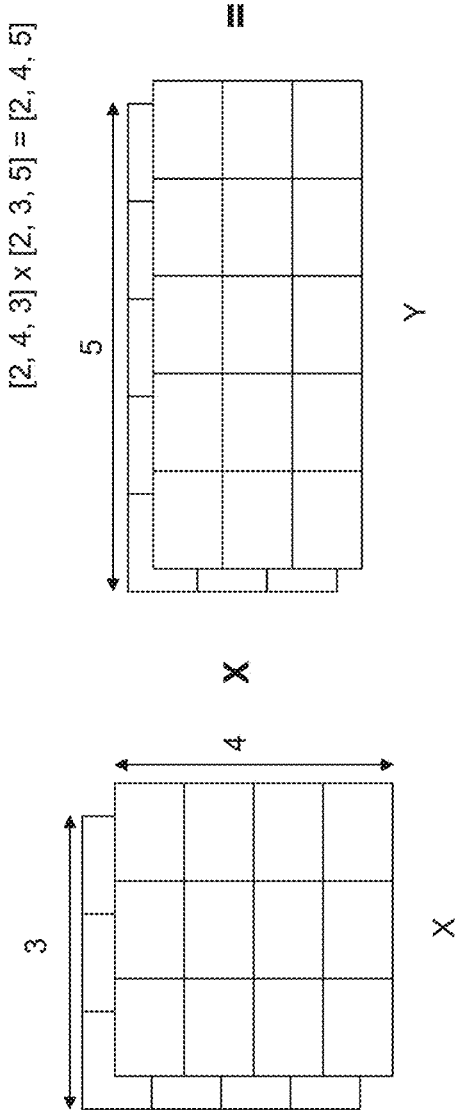

FIG. 1C illustrates a batch matrix multiplication between a tensor X having dimensions [2, 4, 3] and a tensor Y having dimensions [2, 3, 5]. This involves 2 matrix multiplications of the kind illustrated in FIG. 1A, and produces an output tensor Z having dimensions [2, 4, 5]. Each channel of the first tensor X is multiplied by the respective channel of the second tensor Y, to produce a respective channel of the output tensor Z.

Figure 1D:
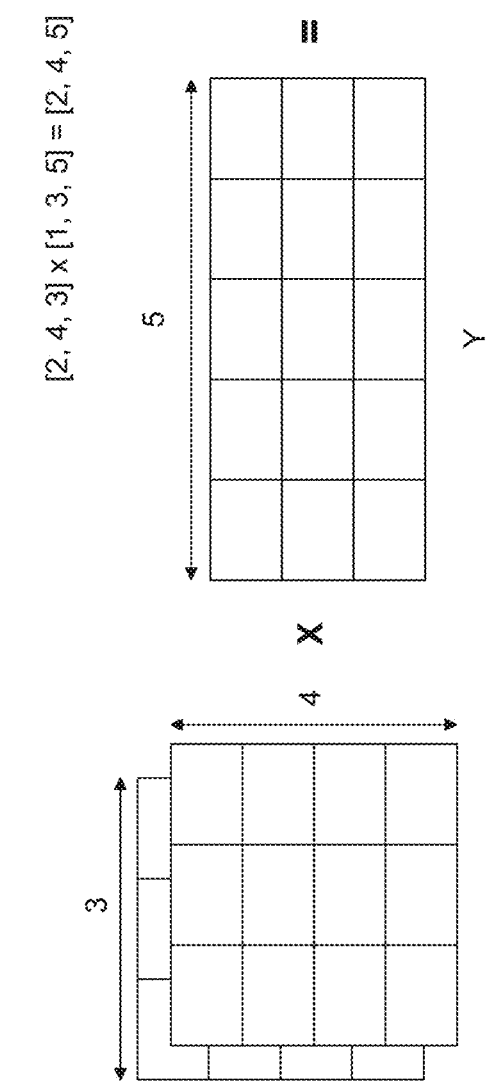
FIG. 1D illustrates a batch matrix multiplication with broadcasting.

FIG. 1D illustrates another example of batch matrix multiplication. This is similar to the example of FIG. 1C, with the exception that the second tensor Y has dimensions [1, 3, 5]. Broadcasting is therefore carried out over the channel dimension of Y, such that each channel of the first tensor X is multiplied by the single channel of Y, to produce a respective channel of the output tensor Z.

All of the operations illustrated in FIG. 1A-1D may be implemented in the fixed-function hardware of a hardware accelerator (neural network accelerator), according to examples of the present disclosure.

Figure 2:
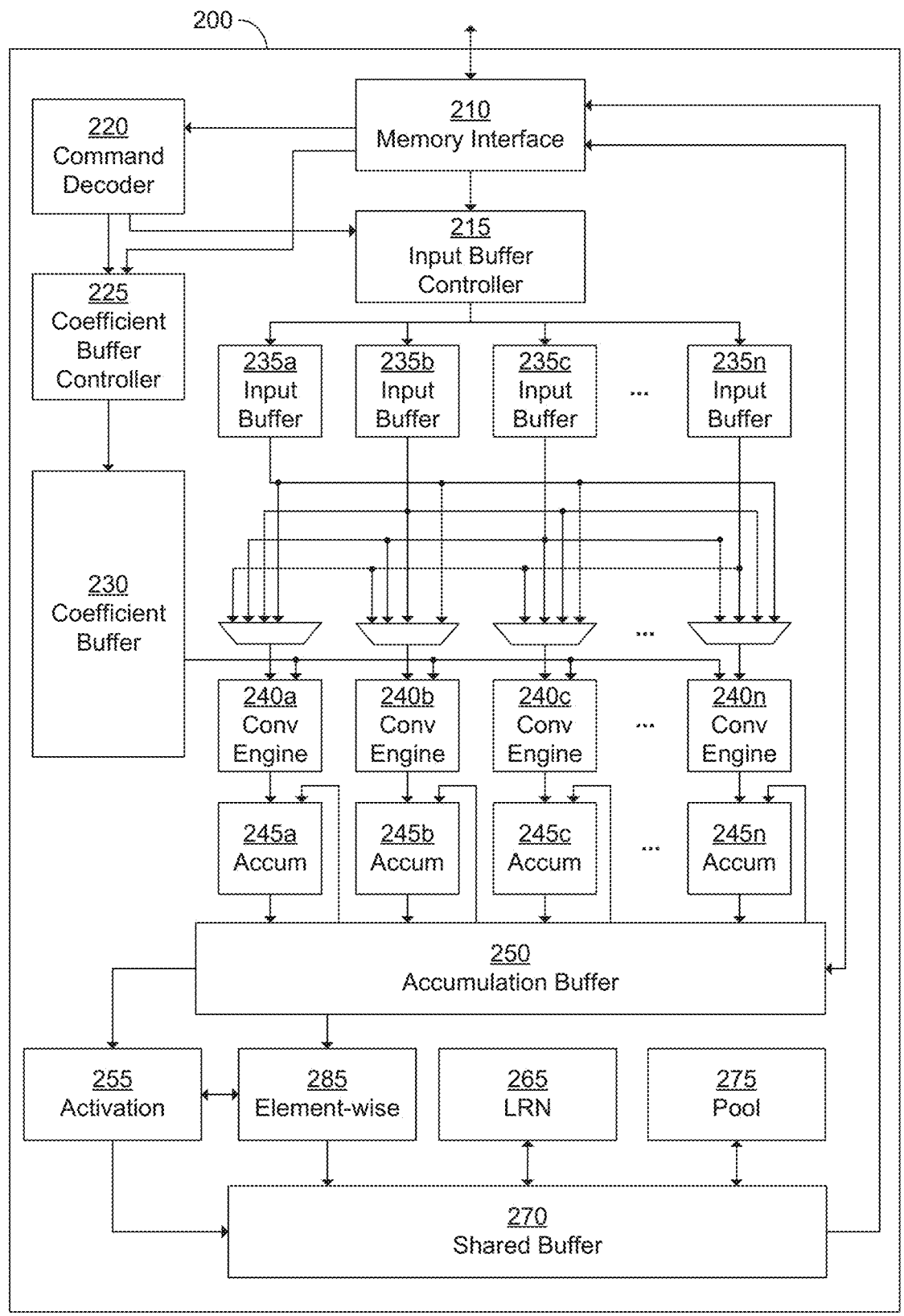
FIG. 2 is a block diagram of a hardware accelerator comprising fixed-function hardware, according to an example of the present disclosure.

As shown in FIG. 2, an exemplary hardware accelerator 200 (also referred to herein as a neural network accelerator or NNA) includes the following fixed-function hardware units:

A set of convolution engines 240, specialised at convolution operations;

An element-wise operations unit 285, specialised at performing the same operation to every pair of respective elements of two tensors of corresponding size;

An activation unit 255, specialised at applying an activation function (which may be selectable, configurable, or fully programmable) to every element of a tensor;

A local response normalisation (LRN) unit 265 (or normalisation unit, for short), specialised at performing neighbourhood-based normalisation operations; and A pooling unit 275, specialised at performing pooling operations, such as max-pooling and min-pooling.

In greater detail, the hardware accelerator 200 comprises digital logic circuitry that is configured to receive data (including weights and input tensors) and commands for processing them. The hardware accelerator 200 comprises a memory interface 210, an input buffer controller 215, a command decoder 220, a coefficient buffer controller 225, a coefficient buffer 230, n input buffers 235, n convolution engines 240, n accumulators 245, an accumulation buffer 250, an activation unit 255, a local response normalize (LRN) unit 265, a shared buffer 270, a pooling unit 275, and an element-wise operations unit 285. The hardware accelerator 200 can be used to evaluate elementary neural network operations in order to implement a matrix multiplication operation.

Figure 4:
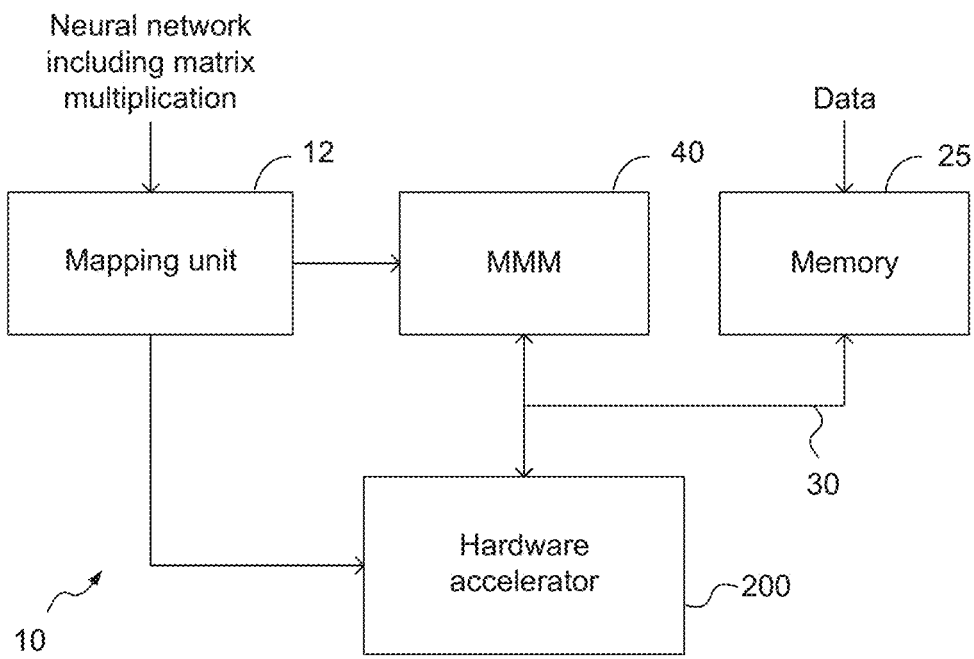
FIG. 4 is a block diagram of a data processing system according to an example.

The memory interface 210 is configured to provide an interface between the hardware accelerator 200 and external memory 25 (not shown in FIG. 2, but shown in e.g. FIG. 4). The external memory 25 may be considered as a separate module to the hardware accelerator 200. The command or configuration information may comprise, for example, information regarding weight and data size and format as well as their location in the external memory.

The memory interface 210 is configured to receive, from external memory 25, weights and data to be used in calculations within the neural network, as well as command information to control the operation of the hardware accelerator 200. The received weights (also referred to herein as coefficients) are passed to the coefficient buffer controller 225 and the received data is passed to the input buffer controller 215. The received commands are passed to the command decoder 220, which, in turn, is configured to decode the commands and subsequently issue control information to elements of the hardware accelerator, including the coefficient buffer controller 225 and input buffer controller 215 to control the manner in which the weight and input data is stored in the buffers.

The weights and input data received from external memory via memory interface 210 during a read of the external memory may form the weights and input data for only a portion of a single layer, all of the weights and input data to be used in processing a single layer, or may comprise the weights and input data for processing multiple layers. For example, the weights received from external memory may form the weights of a single layer and the input data received may form only a portion of the input data for a single layer (or vice versa). Any combination of data and weights across one or more layers may be received from external memory 25 in a single read from the memory (for example using a burst read).

In practice, the number of weights and data received in a single read from external memory 25 will depend upon the size of the coefficient buffer 230 and the input buffer 235. The weights are passed from the coefficient buffer controller 225 to the coefficient buffer 230 and the data received is passed from the input buffer controller 215 to a plurality of input buffers 235a-235n. The number of input buffers will depend upon the specific implementation of the accelerator 200 but may take any value. The input data is shared across all of the input buffers 235a-235n. The input buffers each form an effective bank such that the number of input buffers can be increased or decreased depending on the application.

The input buffers 235a-235n are connected to each of a plurality of multiplexers, since each convolution engine 240a-240n requires access to all of the effective 'banks' of the input data. The multiplexers are each configured to select an output from one of the input buffers 235 and to pass the values output from the selected input buffer 235 to a respective convolution engine 240a-240n. In addition, weights from the coefficient buffer 230 are provided as a second input into each convolution engine 240a-240n. The convolution engines 240 are configured to perform a convolution calculation on the received input data using the weights received from the coefficient buffer 230. The resultant output of each convolution engine 240a-240n is provided as an input to a respective accumulator of a plurality of accumulators 245a-245n.

Each accumulator 245a-245n is connected to an accumulation buffer 250. The accumulation buffer 250 is configured to store accumulated results received from each accumulator 245a-245n. The accumulation buffer 250 is connected to the memory interface 210. As such, the accumulation buffer 250 is configured to send and receive data to and from external memory 25 via memory interface 210. Specifically, the accumulation buffer 250 is configured to be able to store and restore its values from the external memory 25 via memory interface 210, as will be described in more detail below. The accumulation buffer 250 is connected to the input of the accumulators 245a-245n and is configured to feed values back into the accumulators 245a-245n to enable accumulation calculations to take place.

The accumulation buffer 250 is configured to pass accumulated values to the activation unit 255 and/or the element-wise operations unit 285. The activation unit 255 is configured to perform at least one of a number of different activation functions.

The resultant value calculated by the activation unit 255 can be passed to be processed by the LRN unit 265 and/or the pooling unit 275 via the shared buffer 270. The LRN unit 265 is configured to perform a local response normalisation. This may be performed within a single plane of input data. Alternatively or in addition, the LRN operation may also be performed across planes.

A result stored in the shared buffer 270 is passed to the memory interface 210, which can either store the result in external memory 25 or pass the result back into the input buffers for further processing without having to first be passed out to external memory.

The shared buffer 270 is configured to buffer values from any one or more of the activation unit 255, the LRN unit 265, the pooling unit 275, and the element-wise operations unit 285 until all the values required to perform the next operation are available. In this way, the shared buffer 270 is used for efficiency of storage as it can hold values required in later operations without having to use external memory 25.

The element-wise operations unit 285 comprises circuitry configured to perform element-wise operations on tensors received from the accumulation buffer 250 and/or activation unit 255. The supported element-wise operations may include element-wise addition, subtraction, multiplication, division, and maximum (or minimum) of the respective elements of the tensors.

Element-wise operations are operations that are repeated for multiple elements of at least one tensor. The operations are typically repeated for all elements of the tensor. Two categories of element-wise operation may be considered: unary operations, having a single operand, and binary operations, having two operands. The element-wise operations unit 285 handles binary element-wise operations. Element-wise operations may also be performed by other components of the hardware accelerator. For example, the activation unit 255 may perform unary element-wise operations, by applying a function to every element of a tensor.

Whilst the hardware accelerator of FIG. 2 illustrates a particular order in which the units are arranged and thus how the processing of data flows through the hardware implementation, it will be appreciated that the specific calculations required and the order in which data is processed across layers may vary.

In some examples of evaluating neural network layers, the functions performed by the activation 255, LRN 265, pooling 275, and element-wise 285 units may all be performed. In other examples, only some of these functions may be performed and not necessarily in the order set out in the hardware accelerator 200. To achieve a configurable order of processing these functions, each of the activation 255, LRN 265, pooling 275 and element-wise 285 units may be configured to receive control signalling configuring the unit into a bypass mode in which the function is not performed and the input values are simply passed through the unit without change.

In some examples, the data of a particular layer may need to be processed first by the convolution engines 240*a-n* and then second according to the activation, LRN, pooling, and element-wise units 255, 265, 275, 285. In these examples, the outputs from the convolution engines 240*a-n* are passed via the accumulators 245*a-n* to the accumulation buffer 250 and are then passed to activation, LRN, pooling, and element-wise units 255, 265, 275, 285 for further processing. In other examples, the data may need to be processed differently. For example, data may need to be processed first according to the activation, LRN, pooling, and element-wise units 255, 265, 275, 285 and second according to the convolution engines 240*a-n*.

In these arrangements, data can be passed directly to the activation unit 255 via the accumulation buffer 250, where the accumulation buffer 250 has received the input data directly from the memory interface 210 which has received the data from external memory. In this way, the processing performed by convolution engines 240*a-n* and accumulator 245*a-n* is effectively skipped and the data can be passed directly to the activation 255, LRN 265, pooling 275, and element-wise 285 units. Then, once processing using activation, LRN, pooling, and element-wise units 255, 265, 275, 285 is completed, the resultant values can be passed into the input buffer controller 215 via the memory interface 210. In some arrangements, the resultant values can be first passed to external memory 25 via memory interface 210 and then retrieved from external memory 25 before use.

In other arrangements, the memory interface 210 may pass the resultant values to the input buffer controller 215 without passing the values to external memory 25. By avoiding the need to pass the values resulting from calculations using the activation, LRN, pooling, and element-wise unit 255, 265, 275, 285 to external memory 25, memory bandwidth is reduced and therefore the latency in processing the data is also reduced.

Advantageously, since the activation, LRN, pooling, and element-wise units 255, 265, 275, 285 are placed linearly, it is possible to perform these operations sequentially without having to retrieve data from external memory 25. In some implementations, the order in which the activation, LRN, pooling, and element-wise units 255, 265, 275, 285 are connected may vary. For example, the activation, LRN, and pooling units 255, 265, 275 may be connected in reverse order such that the pooling unit is connected to the accumulation buffer 250 and the activation unit is connected to the memory interface 210.

Figure 3:
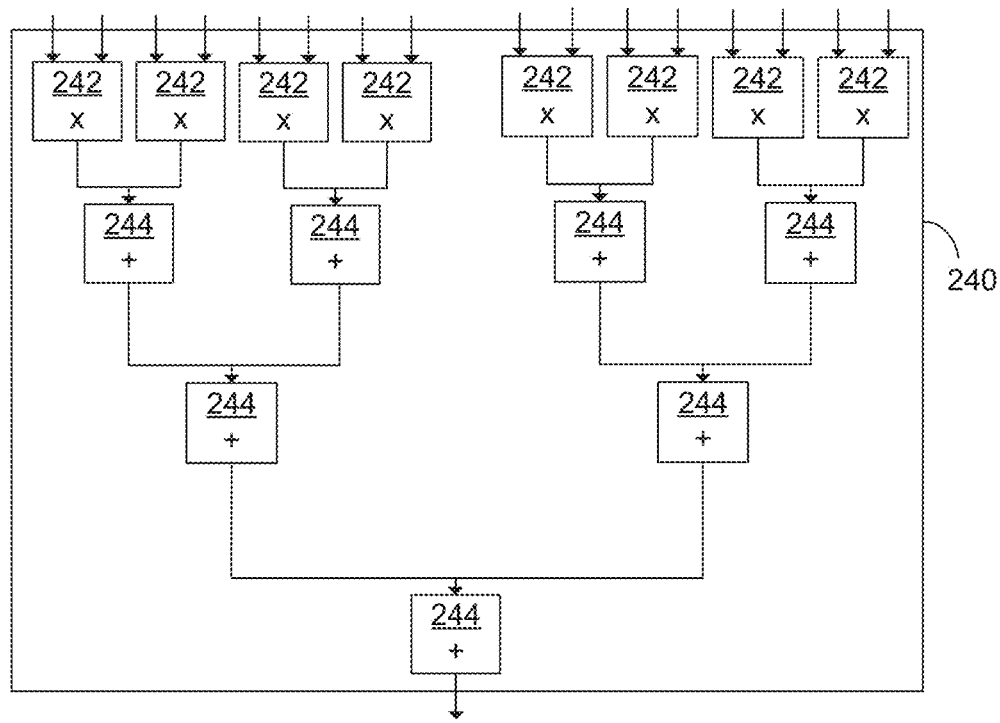
FIG. 3 is a block diagram of a convolution engine as used in FIG. 2.

FIG. 3 illustrates the structure of each of the convolution engines 240 in FIG. 2. The convolution engine 240 comprises a plurality of elements of multiply logic 242, each configured to multiply a weight by an input data element, and a plurality of elements of addition logic 244, configured in a tree structure to sum the outputs of the elements of multiply logic 242.

The exemplary hardware accelerator discussed above does not lend itself to direct evaluation of matrix multiplications, batch matrix multiplications and outer products. According to aspects of the present invention, these operations are instead mapped to other operations, which are directly supported on the exemplary hardware accelerator. Different approaches may be adopted depending on the architecture and capabilities of the hardware accelerator. For example, in some hardware accelerators, the software or hardware might only support convolution using constant weights (coefficients) and might not support dynamic weights. This would restrict the use of convolution-based methods (see below), when wishing to multiply two matrices of dynamic data.

FIG. 4 is a block diagram of a data processing system 10 for implementing a neural network in a hardware accelerator 200 (NNA), according to an example. The neural network includes at least one layer comprising a matrix multiplication operation. The data processing system comprises the hardware accelerator 200; a mapping unit 12; a memory 25; and a memory manipulation module (MMM) 40. At least the hardware accelerator 200, the memory 25, and the MMM 40 are connected by a data bus 30. The mapping unit 12 is configured to receive a definition of the neural network, and map the layer containing the matrix multiplication operation to a graph of elementary neural network operations that can be performed natively by the hardware accelerator 200. The mapping unit 12 is further configured to control the hardware accelerator 200 (and if necessary the MMM 40) to evaluate the matrix multiplication by means of these elementary operations.

The hardware accelerator 200 is configured to evaluate the graph of elementary neural network operations. The MMM 40 is configured to manipulate multidimensional data in memory in various ways, including permute operations that modify the order of the dimensions of the data. In some examples, the MMM 40 may be configured to transform data by rearranging the channel dimension of the data in one or both of the width or height dimensions, or exchanging the channel dimension with one or both of these spatial dimensions. In alternative examples, the MMM may permute any other combination of the dimensions of the input data, including the batch dimension. A transformation from dimensions [B, C, H, W] to dimensions [B, 1, HC, W] is one example of rearranging the channel dimension in the spatial dimensions. A transformation from dimensions [B, C, H, W] to dimensions [B, C/KL, HK, WL] is another such example (where K and L are integers). A transformation from dimensions [B, C, H, W] to dimensions [B, H, C, W] is an example of exchanging the channel dimension with one of the spatial dimensions.

Figure 5:
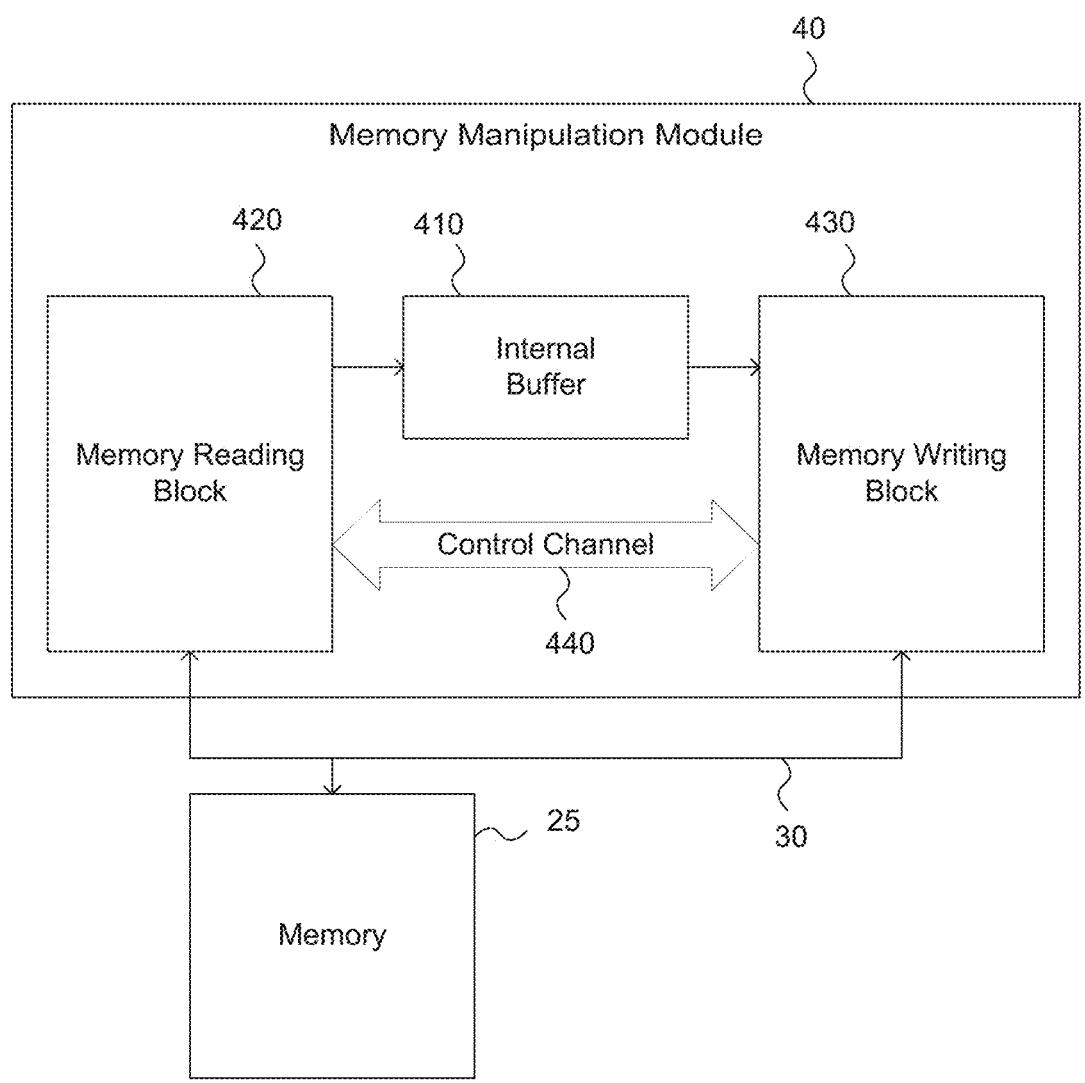
FIG. 5 is a block diagram of the memory manipulation module in FIG. 4.

FIG. 5 is a block diagram of the MMM 40 used in FIG. 4. As mentioned already, the MMM 40 is coupled to the memory 25, via the bus 30. The MMM 40 comprises a memory reading block 420; an internal buffer 410; and a memory writing block 430. A control channel 440 is used to coordinate the operations performed by the memory reading block 420 and the memory writing block 430. Both the memory reading block 420 and the memory writing block 430 are coupled to the bus 30. An output of the memory reading block 420 is coupled to an input of the internal buffer 410. An input of the memory writing block 430 is coupled to an output of the internal buffer 410.

The memory reading block 420 reads data from the memory 25. The memory reading block 420 writes the data (that was read from the memory 25) to the internal buffer 410. The memory writing block 430 reads data from the internal buffer 410 and writes the data (that was read from the internal buffer 410) back to the external memory 25. By the combination of operations performed by the memory reading block 420 and the memory writing block 430, the data may be transformed in the ways previously described. The transformation may occur when moving the data from the memory 25 to the internal buffer 410, or it may occur when moving the data from the internal buffer 410 to the memory 25. In some cases, the transformation may occur in part between the memory 25 and the internal buffer 410, and in part between the internal buffer 410 and the memory 25.

Where the memory reading block 420 and the memory writing block 430 are provided as separate hardware blocks (as in the example of FIG. 4), they may be able to operate in parallel. The control channel 240 provides for communication between the memory reading block 220 and the memory writing block 230, to maintain synchronisation between the two blocks. This synchronisation can ensure, for example, that the memory writing block 430 does not attempt to read data from the internal buffer 410 before it has been written there by the memory reading block 420. Similarly, it can ensure, that the memory reading block 420 does not overwrite data in the internal buffer 410 before it has been read from there by the memory writing block 430.

Figure 6A:
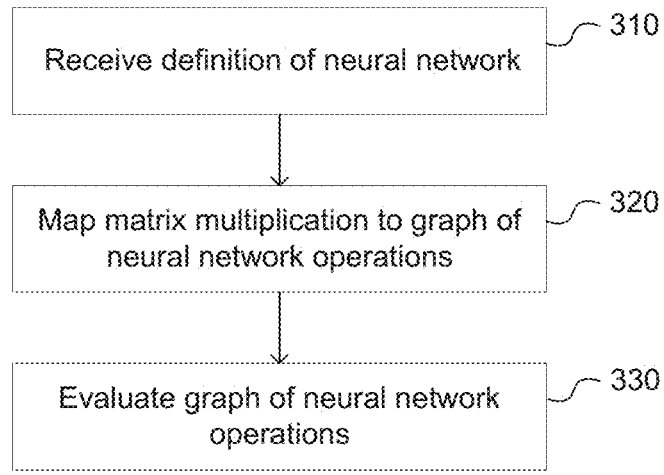
FIG. 6A is a flowchart illustrating a method of implementing a neural network incorporating a matrix multiplication, according to an example.

FIG. 6A is a flowchart illustrating a method performed by the data processing system 10 according to an example of the present disclosure. In step 310, the mapping unit 12 receives a definition of the neural network including the matrix multiplication operation. In step 320, the mapping unit 12 maps the matrix multiplication operation to a graph of elementary neural network operations. This graph may include either (a) at least one convolution operation or (b) at least one element-wise operation. In step 330, the hardware accelerator 200 evaluates the graph of neural network operations, thereby evaluating the matrix multiplication operation. The at least one convolution operation or at least one element-wise operation is evaluated in fixed function hardware in the hardware accelerator 200.

Figure 6B:
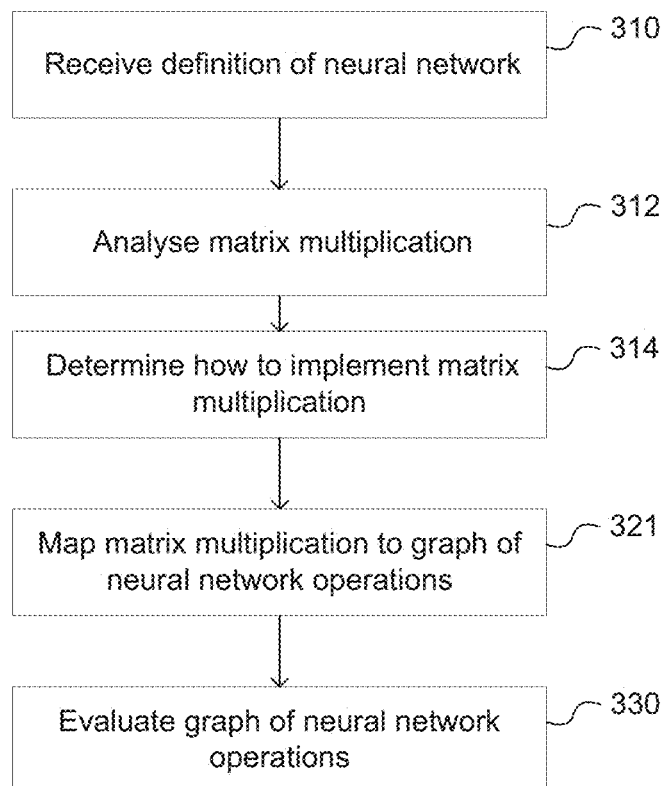
FIG. 6B is a flowchart illustrating a method of implementing a neural network incorporating a matrix multiplication, according to another example.

In some examples, the data processing system 10 may be configured to choose how to evaluate the matrix multiplication operation. FIG. 6B is a flowchart illustrating such an example. Step 310 is the same as in FIG. 6A. The method of FIG. 6B includes two additional steps, compared with the method of FIG. 6A. In step 312, the mapping unit 12 analyses the matrix multiplication operation. In step 314, the mapping unit 12 determines, based on the results of the analysis, how to implement the matrix multiplication operation. In particular, based on the results of the analysis, the mapping unit 12 determines that the matrix multiplication operation should be implemented using a graph of elementary neural network operations including (a) at least one convolution operation and/or (b) at least one element-wise operation, and rejects the other alternative. In the subsequent step 321, the mapping unit 12 maps the matrix multiplication operation to the appropriate graph of neural network operations, depending on the result of the determination in step 314. That is, the mapping unit 12 maps the matrix multiplication operation to a graph of elementary neural network operations comprising either (a) at least one convolution operation or (b) at least one element-wise operation, as appropriate. The hardware accelerator 200 evaluates the matrix multiplication by means of the graph of elementary neural network operations, in step 330

The analysis in step 312 and determination in step 314 may be performed by the mapping unit 12 in a variety of ways. According to one example, the mapping unit 12 may determine how to implement the matrix multiplication based on a hardware capability of the fixed-function hardware, a capability of software or firmware running on the fixed-function hardware, and/or a type of the matrix multiplication operation. In some cases, the hardware accelerator 200 may distinguish between data tensors and weight tensors. Weight tensors may be stored in a different format and/or numerical precision, for instance. In such a hardware accelerator, it might not be possible to apply a data tensor as a weight tensor in a convolution operation. Therefore, the hardware accelerator might not have the capability to implement the matrix multiplication by means of a convolution operation, when the matrix multiplication requires multiplication of two data tensors. In such an example, the mapping unit 12 may check whether the matrix multiplication involves the multiplication of two data tensors. If so, the mapping unit 12 may determine, in step 314 that the matrix multiplication operation should be implemented by means of at least one element-wise operation.

Other criteria may also be used to determine how to implement the matrix multiplication. For example, if the first tensor or the second tensor is smaller than a predetermined size (in one or more dimensions) then the mapping unit 12 may elect to implement the matrix multiplication by means of at least one element-wise operation. In general, it is believed that implementation by means of element-wise operations is likely to be less efficient than implementation by means of convolution. However, if the matrices involved are small, then the difference in performance may be minimal, and it may be preferable to keep the convolution engines available for other convolution operations (for example, to evaluate other preceding or succeeding layers of the neural network).

In some examples, the mapping unit 12 may calculate an expected cost of implementing the matrix multiplication via each different potential graph of neural network operations. The expected cost may take account of the execution time, memory size, memory access bandwidth, number of hardware passes and/or power-consumption necessary to implement the matrix multiplication by a given graph of neural network operations. This may include not only the expected cost of the key computational operations (for example, convolution or element-wise multiplication) but also the expected cost of any necessary transformations of the tensors to place them in the required form for those computational operations.

Various examples of ways of implementing matrix multiplication operations will now be described in greater detail. Without loss of generality, in these examples, we assume that the batch size $B=(\max(M, M') \max(N, N'))=MN$, such that $M>=M'$ and $N>=N'$. However, it should be understood that this is not limiting on the scope. If the batch size is different from this (for example, if $M'>M$ and/or $N'>N$), the algorithms would need only replication and/or permutes and/or reshapes for the corresponding tensors. A first set of examples is illustrated in FIGS. 7-11. These examples rely upon convolution operations to evaluate matrix multiplication operations.

Figure 7:
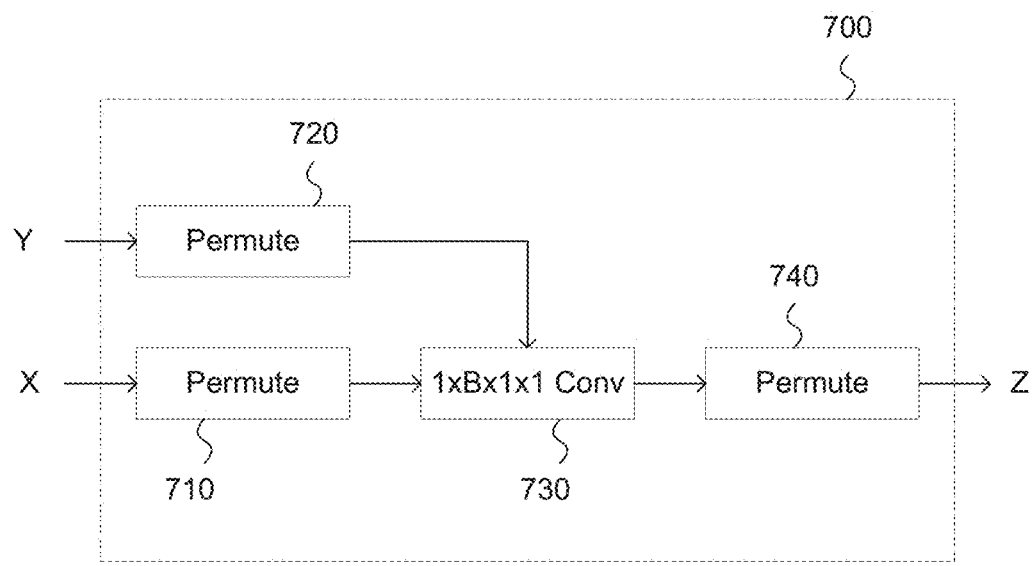
FIG. 7 illustrates a computational graph made up of elementary neural network operations for implementing a matrix multiplication using a convolution operation, according to an example.

In the computational graph illustrated in FIG. 7, the graph of neural network operations 700 for implementing a matrix multiplication comprises a convolution 730, and transformations 710, 720, 740, which are applied to the input and output of the convolution. The first tensor X will provide the data tensor for the convolution; the second tensor Y will provide the weights for the convolution. A first permute operation 710 is applied to the first tensor X. This permute operation rearranges the dimensions of X from [1, 1, P, Q] to [1, Q, 1, P]. The width dimension with size Q is placed in the channel dimension; and the height dimension with size P is placed in the width dimension.

In the present implementation, it is preferred to use a width dimension greater than one for data tensor X, because the hardware accelerator 200 is configured to parallelise over the width dimension when performing convolutions, for example by processing adjacent windows across the convolution engines 240. In another implementation, the hardware accelerator might be configured to parallelise over the height dimension. In such a case, it might be advantageous to instead leave the height dimension in place, such that the reconfigured first tensor would have dimensions [1, Q, P, 1].

A second permute operation 720 is applied to the second tensor Y. This operation rearranges the dimensions of Y from [1, 1, R] to [R, Q, 1, 1]. Thus, the height dimension with size Q is placed in the input channel dimension. The width dimension with size R is placed in the output channel dimension. The first and second permute operations are examples of first transformations, to prepare the input data before the multiplication calculations are performed. Note that, in the case that one of the inputs to the matrix multiplication is constant, the respective first transformation (permute operation 710 or 720) may be precomputed, such that the constant matrix is stored ready in its permuted form.

The matrix multiplication can then be implemented by a 1×1 convolution 730, using the reconfigured first tensor X as data, and using the reconfigured second tensor Y as weights. The convolution 730 has R filters, Q input channels, stride 1 and no padding. The output of this convolution will have dimensions [1, R, 1, P]. A third permute operation 740 is applied to this, to restore the dimensions to the configuration corresponding to the original inputs X and Y. Following the permute 740, the result Z of the matrix multiplication has dimensions [1, 1, P, R]. The third permute operation is an example of a second transformation, applied to the results of the multiplication calculations, to restore data such that the dimensions are in a desired order. Usually, this will match the ordering of the dimensions of the input data. It should be understood that the second transformation (third permute operation 740) may be eliminated in some circumstances. In particular, if the neural network includes two successive matrix multiplications, then the output of the convolution 730 in the first of these matrix multiplications may be passed directly to an input of the convolution 730 in the second matrix multiplication (eliminating also the second permute operation 710 in the second matrix multiplication). In essence, the third permute operation 740 in the first matrix multiplication and the first permute operation 710 in the second matrix multiplication cancel one another out. In this way, the first permute operation 710 may be performed only at the start of a sequence of successive matrix multiplications, and the third permute operation may be performed only at the end of that sequence.

Figure 8:
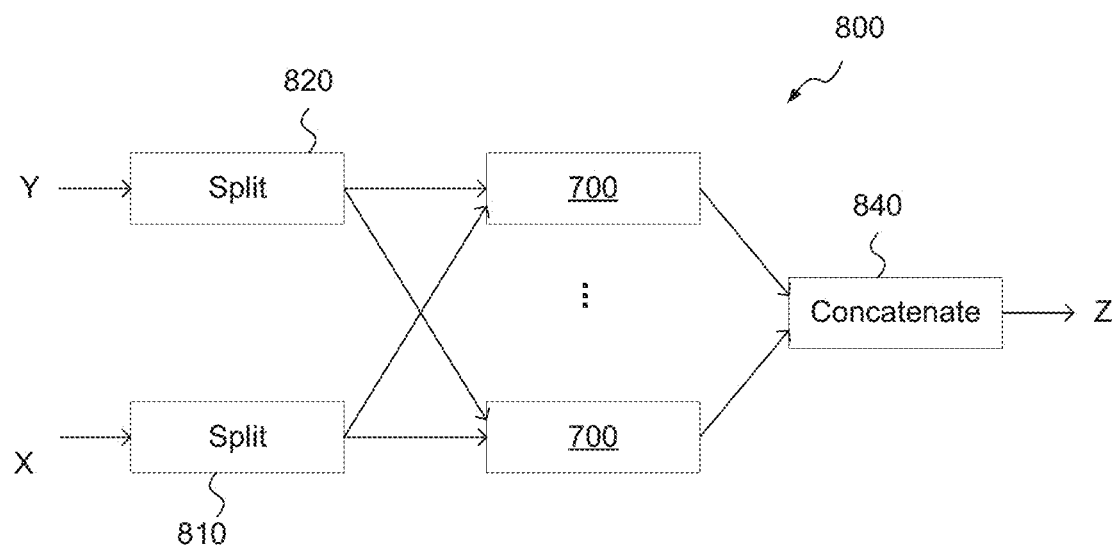
FIG. 8 illustrates a computational graph made up of elementary neural network operations for implementing a batch matrix multiplication using convolutions, according to an example.

FIG. 8 extends the approach of FIG. 7 to construct a graph of neural network operations 800 for implementing a batch matrix multiplication. The approach taken in FIG. 8 is to split the batch matrix multiplication into individual matrix multiplications, and to implement each of the individual matrix multiplications using the approach of FIG. 7. The first tensor X, which has dimensions [M, N, P, Q], is split 820 into MN constituent matrices each having dimensions [1, 1, P, Q]. For the second tensor Y, if broadcasting is required (that is, if M'=1 and/or if N'=1), then the relevant dimensions of Y are repeated making it of shape [M, N, Q, R]. The second tensor Y is split into MN constituent matrices each having dimensions [1, 1, Q, R]. The respective pairs of constituent matrices are each multiplied together using the graph of neural network operations 700 in the computational graph shown in FIG. 7. Each of these implements the matrix multiplication as a convolution 730, and produces a respective tensor of dimensions [1, 1, P, R]. If broadcasting is involved, then this can be handled by feeding the same constituent matrix to multiple instances of the operations 700. The results of the MN operations are then concatenated 840, to construct the result of the batch matrix multiplication with dimensions [M, N, P, R].

Figure 9:
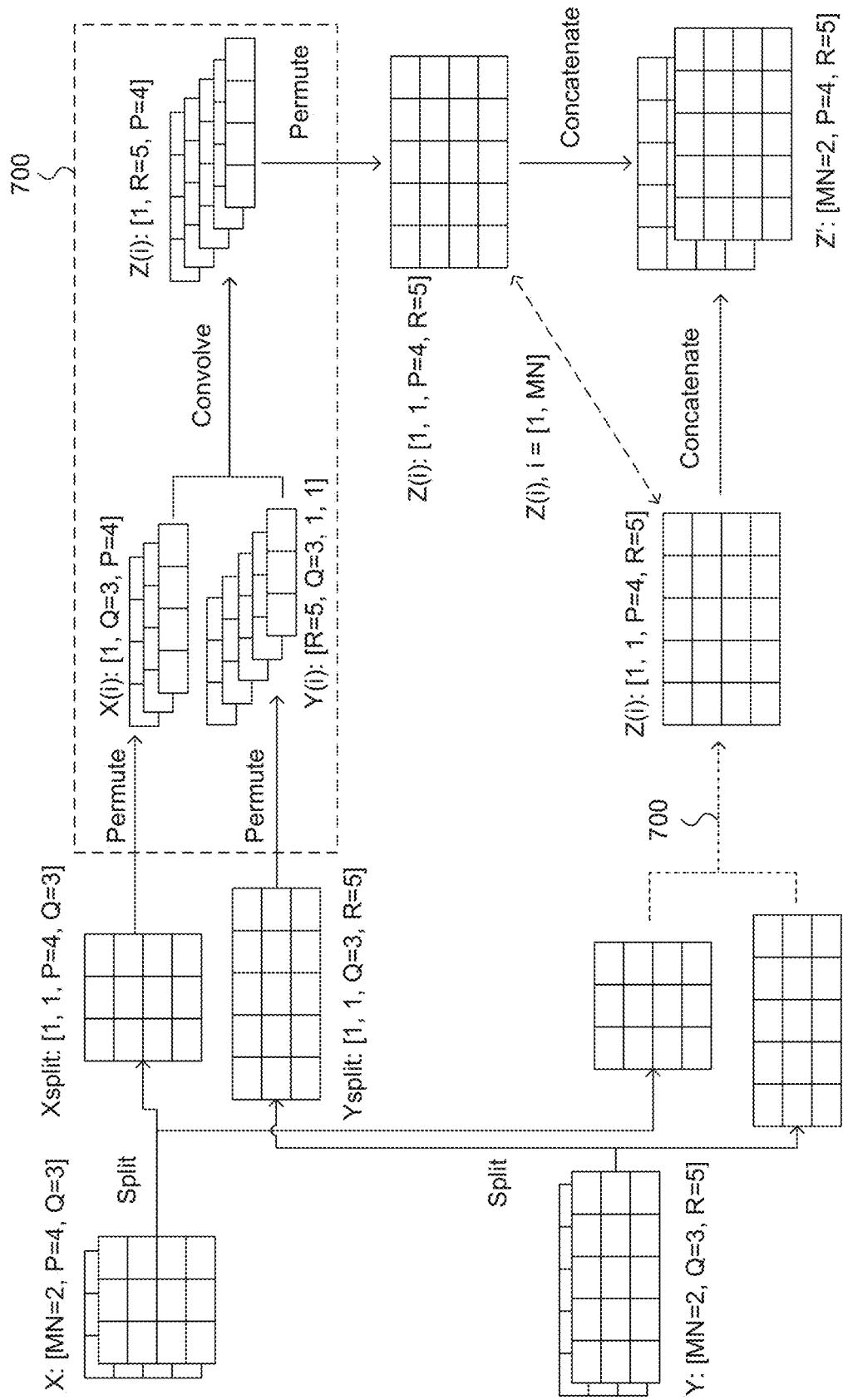
FIG. 9 shows a practical instance of batch matrix multiplication, based on the computational graph in FIG. 8.

FIG. 9 shows one specific instance relying on the approach of FIGS. 7-8. A batch matrix multiplication is performed between a first tensor X with dimensions [MN=2, P=4, Q=3] and a second tensor Y with dimensions [MN=2, Q=3, R=5]. Here, without loss of generality, we are considering only the combined size MN of the individual dimensions M and N. The method works in the same way, irrespective of whether M'=1 and N'=2, or M'=2 and N'=1. The first tensor X is split 810 into two tensors each of dimensions [1, 1, 4, 3]. Each of these is permuted 710 into a first reconfigured tensor of dimensions [1, 3, 1, 4]. The second tensor Y is split 820 into two tensors of dimensions [1, 1, 3, 5], each of which is permuted 720 into a second reconfigured tensor of dimensions [5, 3, 1, 1]. Each first reconfigured tensor (acting as data) is convolved 730 with the respective second reconfigured tensor (acting as weights), to produce an output with dimensions [1, 5, 1, 4]. These are permuted 740 to have dimensions [1, 1, 4, 5] and concatenated 840 to produce an output tensor Z with dimensions [MN=2, P=4, R=5].

Figure 10:
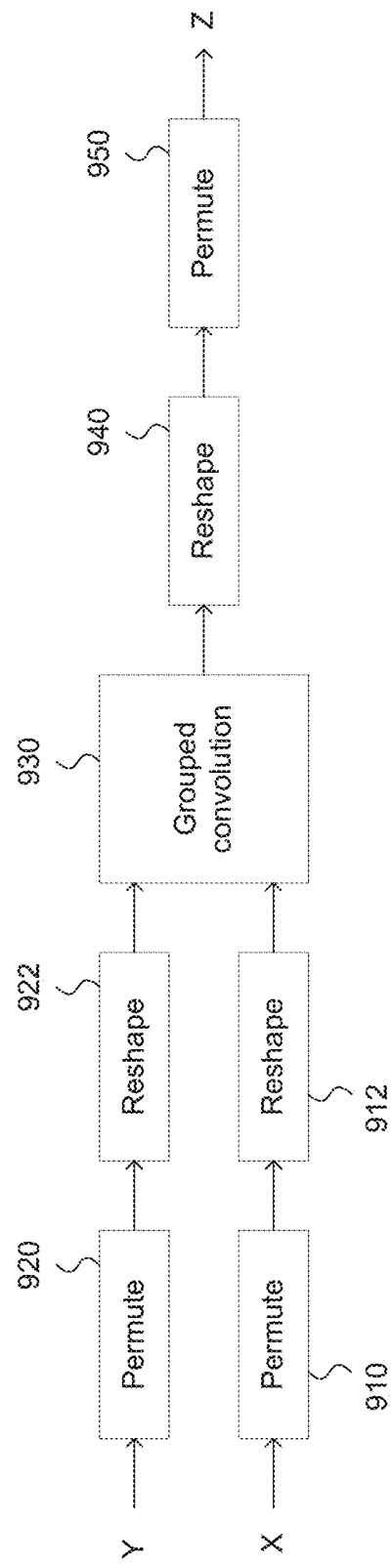
FIG. 10 illustrates a computational graph made up of elementary neural network operations for implementing a batch matrix multiplication using a grouped convolution, according to an example.
Figure 11:
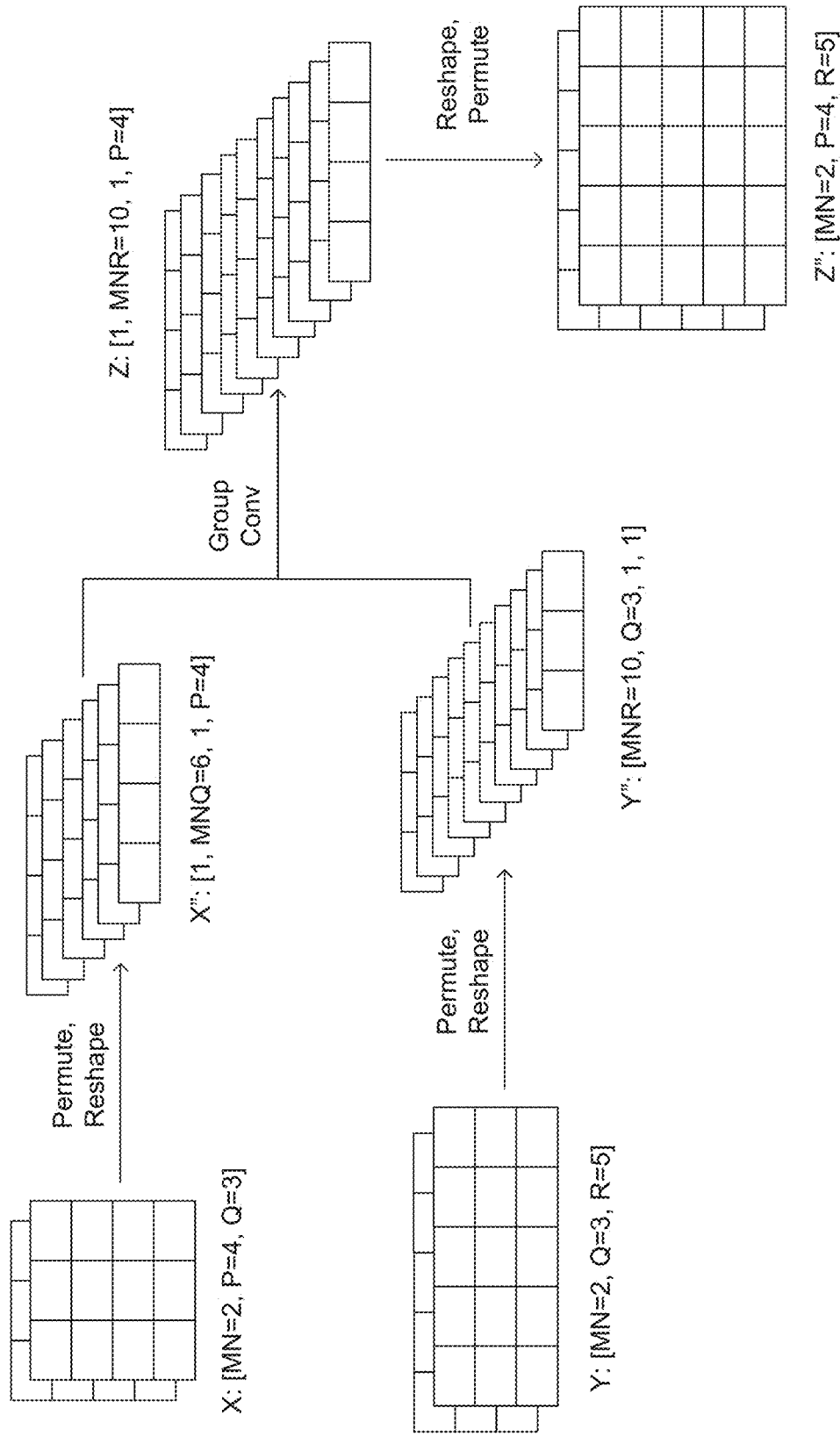
FIG. 11 shows a practical instance of batch matrix multiplication, based on the computational graph in FIG. 10.

FIG. 10 shows a computational graph comprising a graph of neural network operations that offer another way of implementing a batch matrix multiplication—this time using a grouped convolution. A specific instance applying this method is illustrated in FIG. 11. The first input tensor X (having dimensions [M, N, P, Q]) is permuted 910 to a tensor of dimensions [M, N, Q, P]. It is then reshaped 912 to a tensor of dimensions [1, MNQ, 1, P]. The second input tensor Y (having dimensions [M', N', Q, R]) is permuted 920 to a tensor of dimensions [M', N', R, Q] and then reshaped 922 to a tensor of dimensions [M'N'R, Q, 1, 1]. If broadcasting is required (that is, if M'=1 and/or if N'=1), then this can be implemented by repeating the relevant dimensions appropriately in Y thereby making it of shape [MNR, Q, 1, 1]. A grouped convolution 930 is then performed, using the first reconfigured tensor [1, MNQ, 1, P] as data and the second reconfigured tensor [MNR, Q, 1, 1] as weights. There are MN groups each having Q channels. This produces a tensor of dimensions [1, MNR, 1, P], which is firstly reshaped 940 to have dimensions [M, N, R, P] and then permuted 950 to produce the output tensor Z with dimensions [M, N, P, R]. The specific instance in FIG. 11 uses input tensors X and Y with the same dimensions as those of FIG. 9, for ease of comparison. If the batch matrix multiplication is part of a sequence of consecutive multiplications, then the final permute operation 950 might not be necessary. In a similar manner to that discussed above for FIG. 7, the initial permute 910 of the next batch multiplication in the sequence effectively cancels with the final permute 950 of the preceding batch multiplication.

Figure 12:
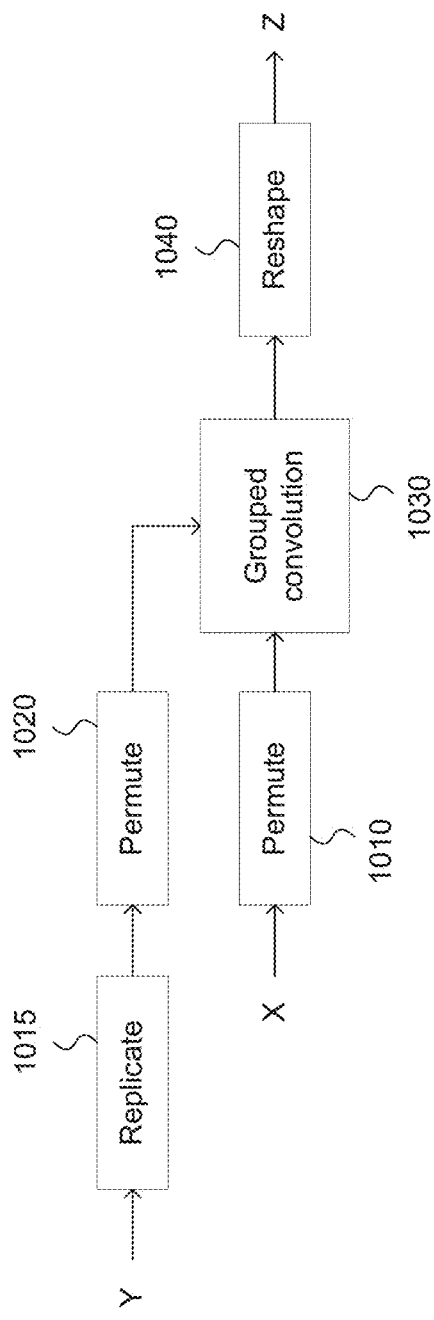
FIG. 12 illustrates a computational graph made up of elementary neural network operations for implementing an outer product using a grouped convolution, according to an example.

An outer product (single outer product or batch outer product) may be implemented as a special case, using the method of any of FIG. 7, 8 or 10, as appropriate. A further alternative, illustrated in FIG. 12, may be used for a single outer product. The first tensor X is permuted 1010 or reshaped to have dimensions [1, P, 1, 1]. The second tensor Y is replicated 1015 P times and permuted 1020 or reshaped. In the present example, this yields a weight tensor of dimensions [RP, 1, 1, 1]. More generally, the permute/reshape operation yields a weight tensor having dimensions suitable for grouped convolution with the reconfigured first tensor of shape [1, P, 1, 1] (as data). The permuted/reshaped weight tensor is then convolved with the reconfigured first tensor of shape [1, P, 1, 1] (as data) using a grouped convolution 1030 with P groups, each with one input channel and R output channels, yielding an output tensor of dimensions [1, PR, 1, 1]. This is then reshaped 1040, to produce the desired output tensor Z with dimensions [1, 1, P, R]. It should be understood that this example is based on the assumption that the data is in NCHW format and the weights are in OIHW format, as mentioned at the outset above. If different formats are used, the permute/reshape operations should be adapted accordingly, to reflect an appropriate grouped convolution with an appropriate weight kernel generating an output of size [1, 1, P, R].

This can also be extended to batch outer product with batch size B, where B=MN. If broadcasting is required (that is, if M'=1 and/or if N'=1), then this can be implemented by appropriately repeating in the relevant dimension for Y. The first tensor X is permuted 1010 or reshaped to have dimensions [1, BP, 1, 1], and the second tensor Y is replicated 1015 P times and permuted 1020 or reshaped to yield a weight tensor of dimensions [RBP, 1, 1 1]. This weight tensor is then convolved with the tensor of shape [1, BP, 1, 1] using a grouped convolution 1030 with BP groups, each with one input channel and R output channels, yielding an output tensor with dimensions [1, BPR, 1, 1]. This is then reshaped 1040, to produce the desired output tensor Z with dimensions [B, 1, P, R].

Figure 13:
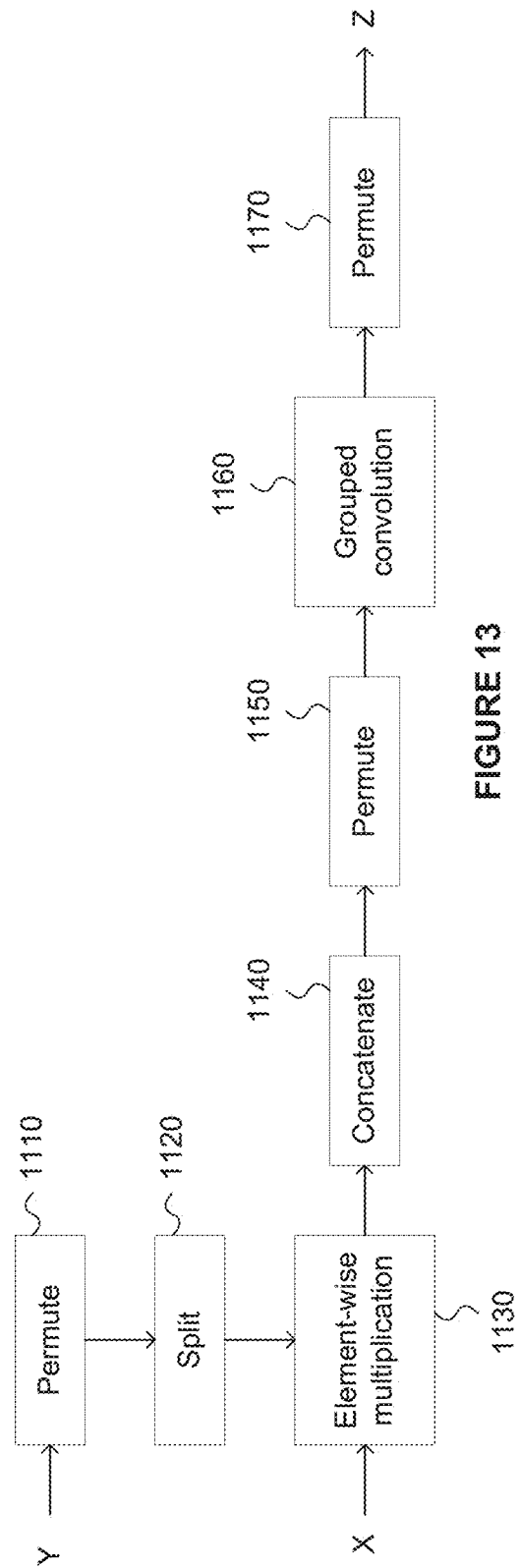
FIG. 13 illustrates a computational graph made up of elementary neural network operations for implementing a batch matrix multiplication using element-wise operations, according to an example.
Figure 14:
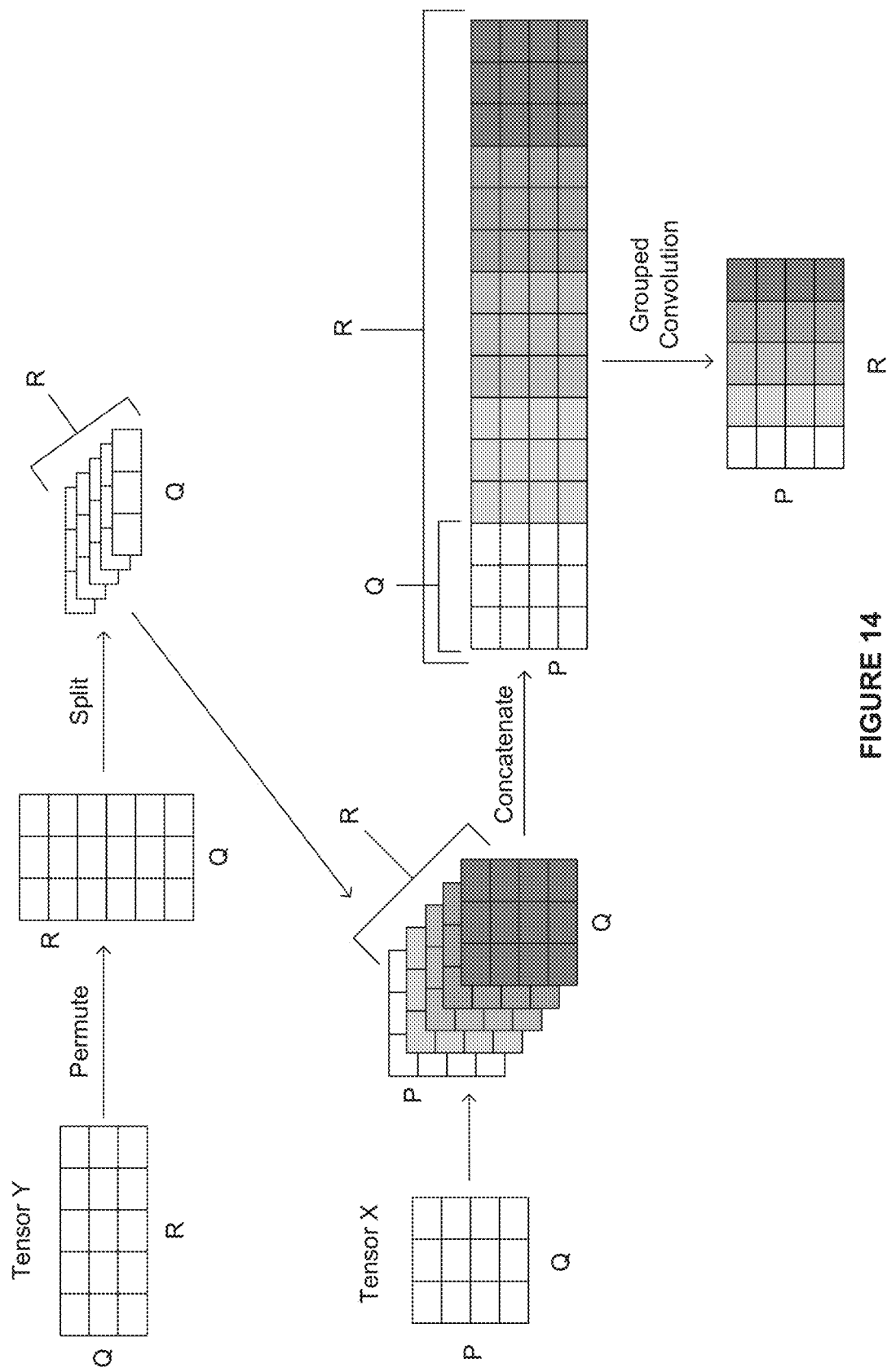
FIG. 14 shows a practical instance of a matrix multiplication, based on the computational graph in FIG. 13.
Figure 15:
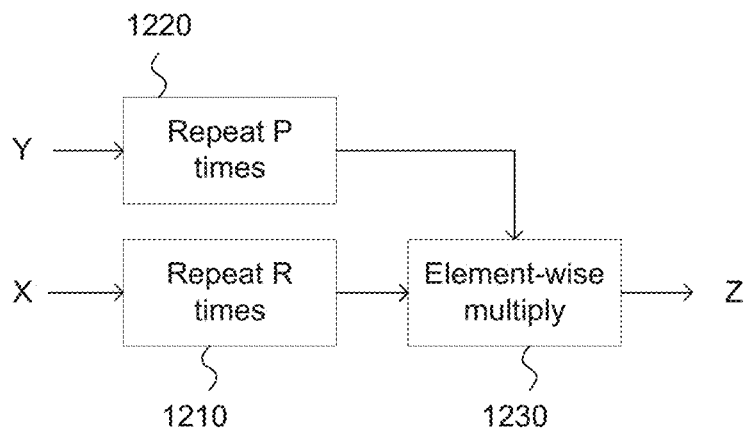
FIG. 15 illustrates a computational graph made up of elementary neural network operations for implementing an outer product using element-wise operations, according to an example.

There are various alternative ways of implementing matrix multiplication operations. A second set of examples is illustrated in FIGS. 13-15. These examples rely upon element-wise operations to evaluate matrix multiplication operations.

FIG. 13 illustrates a computational graph for implementing a batch matrix multiplication using element-wise multiplication, according to an example. For the second tensor Y, if broadcasting is required (that is, if M'=1 and/or if N'=1), then the relevant dimensions of Y are repeated making it of shape [M, N, Q, R]. A permute operation 1110 is applied to the second tensor Y, to reconfigure it into a third tensor having dimensions [M, N, R, Q]. The third tensor is then split 1120, along the height dimension, into R constituent tensors, each of dimensions [M, N, 1, Q]. Element-wise multiplication 1130 is performed between each one of these R constituent tensors and the first tensor X. Recall that the first tensor X has dimensions [M, N, P, Q]; therefore, this element-wise multiplication involves broadcasting over at least the height dimension. Alternatively, the constituent tensors may be replicated explicitly P times over the height dimension, prior to the element-wise multiplication. The output of the element-wise multiplication 1130 consists of R tensors, each having dimensions [M, N, P, Q]. These tensors are concatenated 1140 along the width dimension, producing a tensor of dimensions [M, N, P, RQ]. Next the concatenated tensor is permuted 1150 to reconfigure it into a tensor of dimensions [M, RQ, N, P]. Essentially this operation arranges the results of the element-wise multiplication along the channel axis, in R groups of size Q. The next task is to sum over each group of Q channels. In the present example, this is done by means of a grouped convolution 1160, using a weight tensor consisting entirely of ones and having dimensions [R, Q, 1, 1]. The output of this grouped convolution 1160 has dimensions [M, R, N, P]. In a final step, this tensor is permuted 1170 to reconfigure it into the output Z, with dimensions [M, N, P, R].

FIG. 14 shows a practical instance of a matrix multiplication, based on the computational graph in FIG. 13. Note that—in contrast to FIG. 13—in FIG. 14, the arrows represent operations and the tensors are represented as blocks. In this example, the first tensor X has dimensions [1, 1, 4, 3] and the second tensor Y has dimensions [1, 1, 3, 5]. In step 1110, the second tensor is permuted to produce a third tensor having dimensions [1, 1, 5, 3]. In step 1120, this third tensor is split into 5 constituent tensors each of size [1, 1, 1, 3]. In step 1130, each of the 5 constituent tensors is multiplied element-wise by the first tensor X. This produces 5 respective tensors, each one having dimensions [1, 1, 4, 3]. These are concatenated in step 1140 along the horizontal (width) dimension, to produce a concatenated tensor with dimensions [1, 1, 4, 15]. The width dimension now contains 5 groups of 3 elements in each of the 4 rows. The concatenated tensor is permuted 1150 to reconfigure it with dimensions [1, 15, 1, 4]. (Note that this step is not illustrated in FIG. 14.) Grouped convolution 1160 is performed on this tensor, using a weight tensor of dimensions [5, 3, 1, 1] to sum the groups of 3. The result of this summation/grouped convolution has dimensions [1, 5, 1, 4]. This is permuted 1170 to produce the final output Z, having dimensions [1, 1, 4, 5].

Note that the grouped convolution used in the preceding example is just one way to sum the groups of elements as required. It is possible to implement this step in other ways. For example, starting from the concatenated tensor having dimensions [1, 1, 4, 15], one could instead construct a convolution operation with a row of ones [1, 1, 1, 3], using a stride of 3 in the horizontal direction, and apply this to implement the summation.

Although FIG. 14 illustrates the graph of neural network operations being applied to a single matrix multiplication (M=N=1), the method is general and applies also for batch matrix multiplications (MN>1) without modification.

As discussed previously above, an outer product can be implemented as a special case of matrix multiplication, where Q=1. Therefore, an outer product operation can be implemented by means of the method illustrated in FIG. 13. Another alternative way of implementing an outer product using element-wise operations is illustrated in FIG. 15. Starting with X as a tensor [M, N, P, 1] with width 1 and Y as a tensor [M', N', 1, R] with height 1, X is repeated R times horizontally, in step 1210, and Y is repeated P times vertically, in step 1220. If broadcasting is required (that is, if M'=1 and/or if N'=1), then the relevant dimensions of Y are also repeated making it of shape [M, N, P, R]. The outer product can then be calculated by means of element-wise multiplication 1230.

The repeating 1210 and 1220 is exemplified for a vector outer product as follows. Starting with a column vector X and row vector Y:

$$X \otimes Y = \begin{bmatrix} x_1 \\ x_2 \\ x_3 \\ x_4 \end{bmatrix} [y_1 \; y_2 \; y_3] = \begin{bmatrix} x_1y_1 & x_1y_2 & x_1y_3 \\ x_2y_1 & x_2y_2 & x_2y_3 \\ x_3y_1 & x_3y_2 & x_3y_3 \\ x_4y_1 & x_4y_2 & x_4y_3 \end{bmatrix}$$

The outer product (matrix multiplication) can be implemented by repeating X 3 times horizontally, repeating Y 4 times in the vertical direction, and performing element-wise multiplication:

$$\begin{bmatrix} x_1 & x_1 & x_1 \\ x_2 & x_2 & x_2 \\ x_3 & x_3 & x_3 \\ x_4 & x_4 & x_4 \end{bmatrix} \circ \begin{bmatrix} y_1 & y_2 & y_2 \\ y_1 & y_2 & y_2 \\ y_1 & y_2 & y_2 \\ y_1 & y_2 & y_3 \end{bmatrix} = \begin{bmatrix} x_1y_1 & x_1y_2 & x_1y_3 \\ x_2y_1 & x_2y_2 & x_2y_3 \\ x_3y_1 & x_3y_2 & x_3y_3 \\ x_4y_1 & x_4y_2 & x_4y_3 \end{bmatrix}$$

In some hardware accelerators, the element-wise operations unit may be configured to perform broadcasting on one of both of the operands X and Y, in the relevant dimension(s). In this case, there may be no need to perform the repetition explicitly. Where the repetition does need to be performed explicitly, it may for example be carried out using the MMM 25. In general, repetition can be carried out in a variety of ways. For example, repetition may comprise concatenating a tensor with itself multiple times along a specified dimension. (This may be done by the MMM 25, in particular.) One alternative way of implementing repetition is to apply a convolution with a weight tensor where all elements are equal to 1. For example, if it is desired to replicate on the channel dimension, a kernel with 1 input channel and N output channels can be used. If it is desired to replicate on a spatial axis, then a convolution transpose can be used, in which the kernel should be of size N in the relevant dimension, with stride N in that dimension. These approaches can be combined to replicate on multiple channels simultaneously.

The MMM can be used to implement the other aspects of the at least one transformation, in the graph of neural network operations. In particular, the MMM can be used to implement the various permute, reshape, split and concatenate operations, as required. Element-wise operations can be implemented using the element-wise operations unit 285. Convolutions (including grouped convolutions) can be carried out using the convolution engines 240. In this way, all of the neural network operations in the graph of neural network operations may be implemented in fixed-function hardware.

In the foregoing examples, the mapping unit 12 and the MMM 40 were described as separate components to the hardware accelerator 200. This is not to be understood as limiting. In some examples, the mapping unit 12 (or at least a part of it) and the MMM 40 may be integrated as part of the hardware accelerator 200.

The methods and data processing systems described herein are useful for processing input data of a wide variety of types, in a wide variety of applications. Of particular interest are image processing applications, where an input to the neural network comprises image or video data. The neural network may be configured to process the image or video data and produce further image or video data—for example, image or video data that has had its resolution enhanced, artefacts removed, or visual content otherwise modified in some way. Alternatively, the neural network may be configured to analyse the visual content of the image or video—for example, to detect faces, segment and/or classify objects, etc. Also of particular interest are audio processing applications, including tasks such as denoising, speaker detection/identification. Also of particular interest (and overlapping with audio processing applications in some cases) are NLP applications. These include but are not limited to speech recognition; text-to-speech; and machine translation. In some examples, the neural network may be configured to process multimodal data—that is, data of two or more different types/media. An example would be the use of both image data and text (caption) data for a classification or verification task.

Figure 16:
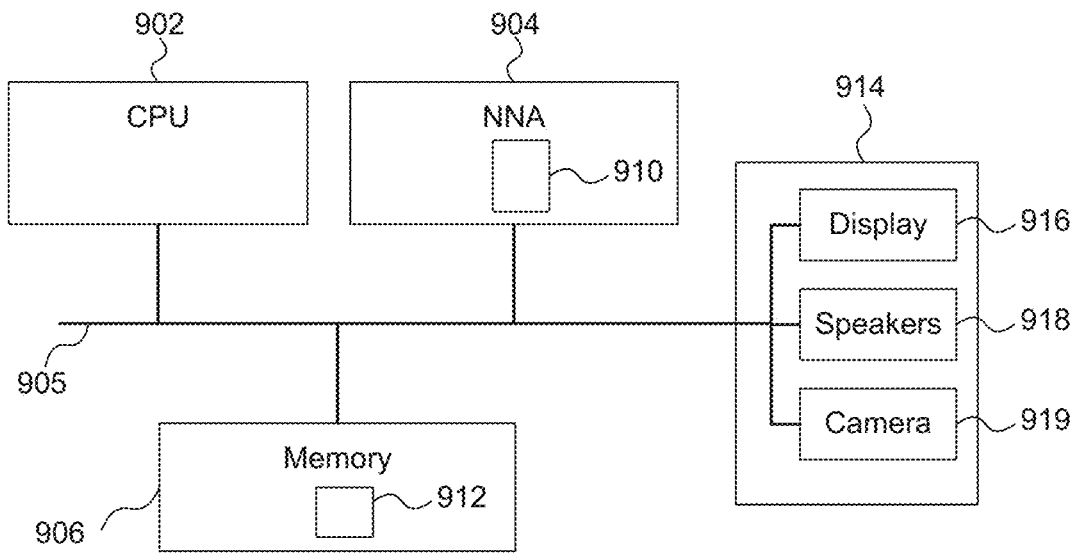
FIG. 16 shows a computer system in which a data processing system is implemented.

FIG. 16 shows a computer system in which the data processing systems described herein may be implemented. The computer system comprises a CPU 902, an NNA 904, a memory 906 and other devices 914, such as a display 916, speakers 918 and a camera 919. A processing block 910 (corresponding to mapping unit 12, MMM 40, and hardware accelerator 200) is implemented on the NNA 904. The components of the computer system can communicate with each other via a communications bus 905. A store 912 (corresponding to memory 25) is implemented as part of the memory 906.

The data processing system of FIG. 4 is shown as comprising a number of functional blocks. This is schematic only and is not intended to define a strict division between different logic elements of such entities. Each functional block may be provided in any suitable manner. It is to be understood that intermediate values described herein as being formed by a data processing system need not be physically generated by the data processing system at any point and may merely represent logical values which conveniently describe the processing performed by the data processing system between its input and output.

The data processing systems described herein may be embodied in hardware on an integrated circuit. The data processing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java® or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a data processing system configured to perform any of the methods described herein, or to manufacture a data processing system comprising any apparatus described herein. An integrated circuit definition dataset may be, for example, an integrated circuit description.

Therefore, there may be provided a method of manufacturing, at an integrated circuit manufacturing system, a data processing system as described herein. Furthermore, there may be provided an integrated circuit definition dataset that, when processed in an integrated circuit manufacturing system, causes the method of manufacturing a data processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS (RTM) and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing system will now be described with respect to FIG. 17.

Figure 17:
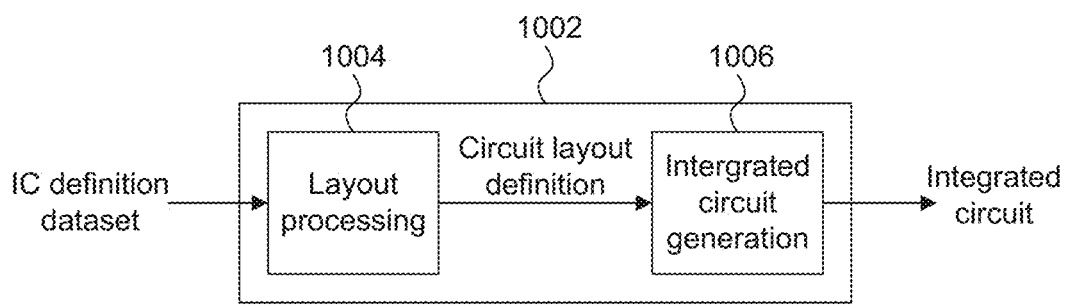
FIG. 17 shows an integrated circuit manufacturing system for generating an integrated circuit embodying a data processing system.

FIG. 17 shows an example of an integrated circuit (IC) manufacturing system 1002 which is configured to manufacture a data processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a data processing system as described in any of the examples herein), process the IC definition dataset, and generate an IC according to the IC definition dataset (e.g. which embodies a data processing system as described in any of the examples herein). The processing of the IC definition dataset configures the IC manufacturing system 1002 to manufacture an integrated circuit embodying a data processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 17 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 17, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of implementing, using a neural network accelerator comprising fixed-function hardware, a neural network comprising a plurality of layers, wherein at least one of the layers comprises a matrix multiplication operation defined in two or more dimensions between a first tensor X having dimensions [ . . . , P, . . . , Q, . . . ] and a second tensor Y having dimensions [ . . . , Q, . . . , R, . . . ], the method comprising:
mapping the matrix multiplication operation to a graph of neural network operations including at least one transformation and at least one convolution operation;
evaluating the graph of neural network operations to thereby evaluate the matrix multiplication operation, wherein the at least one convolution operation is evaluated in the fixed-function hardware; and
implementing, in said fixed-function hardware, said neural network to include a matrix multiplication layer configured to perform a matrix multiplication operation in dependence on the evaluation of the graph, whereby said neural network accelerator is adapted to multiply the same set of weights simultaneously by multiple sets of input data elements in parallel at multiple processing elements.

2. The method of claim 1, wherein:
the first tensor X or a tensor derived from it is treated as input data for the at least one convolution operation, and the second tensor Y or a tensor derived from it is treated as coefficient data for the at least one convolution operation.

3. The method of claim 1, wherein the at least one transformation reconfigures the second tensor Y to arrange the dimension with size R in the output channel dimension before the at least one convolution operation is evaluated.

4. The method of claim 1, wherein the at least one transformation reconfigures both tensors to arrange the dimension with size Q in the input channel dimension before the at least one convolution operation is evaluated.

5. The method of claim 1, wherein the at least one transformation reconfigures the first tensor X to arrange the dimension with size P in a dimension that is traversed by the at least one convolution operation.

6. The method of claim 1, wherein the hardware is configured to evaluate the at least one convolution operation by processing in parallel several sets of one or more input data elements selected along a first dimension traversed by the convolution operation, and
wherein the at least one transformation reconfigures the first tensor X to arrange the dimension with size P in the first dimension.

7. The method of claim 1, wherein:
the first tensor X has dimensions [1, 1, P, Q] and the second tensor Y has dimensions [1, 1, Q, R];
the at least one transformation reconfigures the first tensor X to form a reconfigured first tensor having dimensions [1, Q, 1, P];
the at least one transformation reconfigures the second tensor Y to form a reconfigured second tensor having dimensions [R, Q, 1, 1]; and
the reconfigured first tensor and reconfigured second tensor are input to the at least one convolution.

8. The method of claim 1, wherein:
the first tensor X has dimensions [M, N, P, Q] and the second tensor Y has dimensions [M', N', Q, R], where B=(max (M, M') max (N,N'))>1;
the at least one transformation splits and/or replicates, and reconfigures, the first tensor X to form B reconfigured first tensors each having dimensions [1, Q, 1, P], wherein if M'>M=1 or N'>N=1 the at least one transformation comprises replicating the first tensor in the respective dimension, and if M'=M>1 or N'=N>1 the at least one transformation comprises splitting the first tensor in the respective dimension;
the at least one transformation splits and/or replicates, and reconfigures, the second tensor Y to form B reconfigured second tensors having dimensions [R, Q, 1, 1], wherein if M>M'=1 or N>N'=1 the at least one transformation comprises replicating the second tensor in the respective dimension, and if M'=M>1 or N'=N>1 the at least one transformation comprises splitting the second tensor in the respective dimension; and
the at least one convolution comprises B convolutions applied to respective pairs of the first reconfigured tensors and second reconfigured tensors.

9. The method of claim 8, wherein if either (i) M'=1 and M>1, or (ii) N'=1 and N>1, broadcasting is performed such that the second tensor Y is reused across several convolutions.

10. The method of claim 1, wherein:
the first tensor X has dimensions [M, N, P, Q] and the second tensor Y has dimensions [M', N', Q, R];
the at least one transformation reconfigures the first tensor X to form a reconfigured first tensor having dimensions [1, BQ, 1, P];
the at least one transformation reconfigures the second tensor Y to form a reconfigured second tensor having dimensions [BR, Q, 1, 1]; and
the at least one convolution comprises a grouped convolution, with B groups each with Q input channels and R output channels, applied to the reconfigured first tensor and reconfigured second tensor,
wherein B=(max (M, M') max (N,N')), and wherein:
if M'>M=1 and/or N'>N=1 the reconfiguration of the first tensor comprises replicating the first tensor M' times and/or N' times in the respective dimensions; and
if M>M'=1 and/or N>N'=1 the reconfiguration of the second tensor comprises replicating the second tensor M times and/or N times in the respective dimensions.

11. The method of claim 1, wherein the first tensor X has dimensions [M, N, P, 1] and the second tensor Y has dimensions [M', N', 1, R].

12. The method of claim 1, further comprising, before mapping the matrix multiplication operation to the graph of neural network operations,
analysing the matrix multiplication operation, and
determining, based on a result of the analysing, how to implement the matrix multiplication operation, comprising determining that the matrix multiplication operation should be implemented using the at least one transformation and the at least one convolution operation, and rejecting at least one alternative method for implementing the matrix multiplication operation.

13. The method of claim 12, wherein the determining how to implement the matrix multiplication operation is based on one or more of:
a size of the first tensor in one or more dimensions;
a size of the second tensor in one or more dimensions;
a memory-access bandwidth required to implement the matrix multiplication operation using the selected method;
a memory size required to implement the matrix multiplication operation using the selected method;
a number of hardware passes through the fixed-function hardware that will be required to implement the matrix multiplication operation using the selected method;
an execution time on the fixed function hardware that will be required to implement the matrix multiplication operation using the selected method;
a power consumption required to implement the matrix multiplication operation using the selected method; and
a capability of the fixed-function hardware.

14. The method of claim 1, wherein the layer comprising the matrix multiplication operation is a classification layer, for classifying an input to the neural network into one of a number of categories.

15. The method of claim 1, wherein the neural network is configured for use in one of:
a natural language processing application; and
an image processing application,
and/or wherein the neural network comprises an attention-based neural network.

16. A non-transitory computer readable storage medium having stored thereon computer readable code configured to cause the method of claim 1 to be performed when the code is run.

17. A data processing system for implementing a neural network comprising a plurality of layers, wherein at least one of the layers comprises a matrix multiplication operation defined in two or more dimensions between a first tensor X having dimensions [ . . . , P, . . . , Q, . . . ] and a second tensor Y having dimensions [ . . . , Q, . . . , R, . . . ], the data processing system comprising:
a mapping unit, configured to map the matrix multiplication operation to a graph of neural network operations including at least one transformation and at least one convolution operation; and
a neural network accelerator comprising fixed-function hardware,
wherein the neural network accelerator is configured to evaluate the graph of neural network operations to thereby evaluate the matrix multiplication operation,
wherein the at least one convolution operation is evaluated in the fixed-function hardware, and
whereby said neural network accelerator is adapted to multiply the same set of weights simultaneously by multiple sets of input data elements in parallel at multiple processing elements.

18. The data processing system of claim 17, wherein the fixed-function hardware comprises:
an input buffer, configured to temporarily store input data elements;
a coefficient buffer, configured to temporarily store weights; and
a plurality of processing elements, each of which is configured to multiply one or more input data elements by one or more respective weights,
wherein, in each of a plurality of hardware cycles:
the coefficient buffer is configured to supply one set of one or more weights concurrently to all of the processing elements, and
the input buffer is configured to supply each of the processing elements with respective different sets of one or more input data elements.

19. The data processing system of claim 17, further comprising a memory manipulation module, for manipulating data stored in a memory, wherein the at least one transformation is performed using the memory manipulation module.

20. The data processing system of claim 19, wherein the memory manipulation module comprises:
an internal buffer;
a memory reading block, configured to read data from the memory and write the data to the internal buffer;
a memory writing block, configured to read the data from the internal buffer and write the data to the memory; and
a control channel between the memory reading block and the memory writing block, wherein the memory reading block and the memory writing block are configured to communicate via the control channel to maintain synchronisation between them when writing the data to the internal buffer and reading the data from the internal buffer, respectively.

* * * * *